US006304927B1

(12) United States Patent
Mishra et al.

(10) Patent No.: US 6,304,927 B1
(45) Date of Patent: Oct. 16, 2001

(54) DIGITAL COPIER WITH SCALABLE ARCHITECTURE

(75) Inventors: Sudhindra Nath Mishra, Milpitas; Shingo Yamaguchi, Cupertino, both of CA (US)

(73) Assignees: Ricoh Company, Ltd., Tokyo (JP); Logic Plus Plus, Inc., Milpitas, CA (US)

( * ) Notice: Subject to any disclaimer, the term of this patent is extended or adjusted under 35 U.S.C. 154(b) by 0 days.

(21) Appl. No.: 09/191,112

(22) Filed: Nov. 13, 1998

(51) Int. Cl.$^7$ ........................................................ G06F 3/00
(52) U.S. Cl. .......................... 710/65; 710/100; 710/126; 710/129; 382/284; 382/233; 386/117; 345/98
(58) Field of Search ................................ 710/5, 100, 101, 710/126, 129, 65; 382/284, 233; 386/117; 345/98

(56) References Cited

U.S. PATENT DOCUMENTS

| | | | |
|---|---|---|---|
| 4,271,476 | 6/1981 | Lotspiech | 364/515 |
| 5,819,110 | 10/1998 | Motoyama | 710/15 |
| 5,856,817 | * 1/1999 | Matsuzaki | 345/98 |
| 5,928,335 | * 7/1999 | Morita | 709/303 |
| 5,995,678 | * 11/1999 | Motoyama | 382/284 |
| 6,031,964 | * 2/2000 | Anderson | 386/117 |
| 6,157,743 | * 12/2000 | Goris et al. | 382/233 |

FOREIGN PATENT DOCUMENTS

09186836 * 7/1997 (JP) .

OTHER PUBLICATIONS

Kai Hwang et al., Computer Architecture and Parallel Processing, 1984, pp. 79–98.
Preliminary Product Brief of the $V_{RC}$4373 Interface Controller for the $V_R$4300 Microprocessor, Jul. 1997, 2 pages.
Brochure on NEC $V_R$4300 Microprocessor, 1997, 1 page.
Press Release of NEC VRC4373 Interface and Memory Controller, Jul. 1997, 2 pages.
"Specifications for Splash PCI 1280", From the Internet Printed in Sep. of 1998, 2 pages.
"Specifications of Splash PCI 640E", Printed From the Internet in Sep. of 1998, 2 pages.
"The Indispensable Pentium Book", By Hans–Peter Messmer, Published by Addison–Wesley, 1995, pp. 207–218.

* cited by examiner

*Primary Examiner*—Thomas Lee
*Assistant Examiner*—Tammara Peyton
(74) *Attorney, Agent, or Firm*—Oblon, Spivak, McClelland, Maier & Neustadt, P.C.

(57) ABSTRACT

A digital copier or multi-function device with a scalable architecture which provides for a reusability of the architecture and reduced cost of the system. The digital copier utilizes an industry standard bus such as the PCI bus for communicating image data. Further, the architecture does not require the tightly coupling of added software and hardware. Generally, the processor of the system has the capability to carry out the additional functions and the new software to carry out the added functions may be stored in a disk drive or other memory and executed by the processor. Thus, the added hardware can be controlled by the processor of the digital copier. The image is manipulated in smaller blocks by performing functions such as rotation of the image, flipping of the image, performing a logical function on two images, and repeating a section of the image. The manipulation of the data in blocks in conjunction with the flexible architecture provides for a high speed of copies by the digital copier.

38 Claims, 20 Drawing Sheets

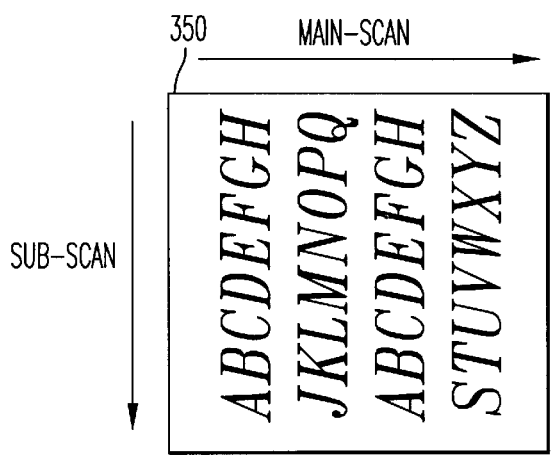
*FIG. 12A*
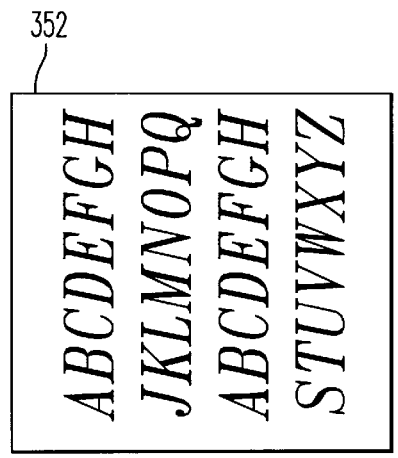
*FIG. 12B*
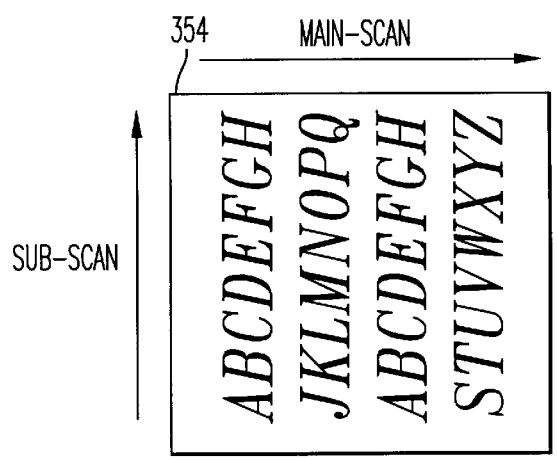
*FIG. 13A*
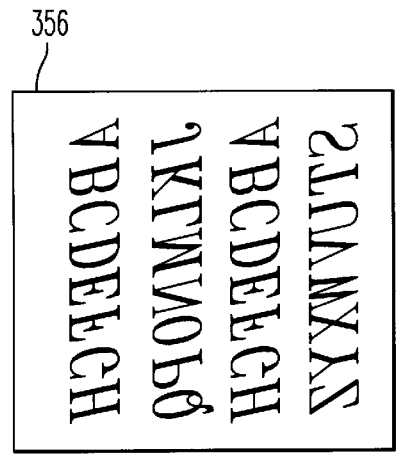
*FIG. 13B*
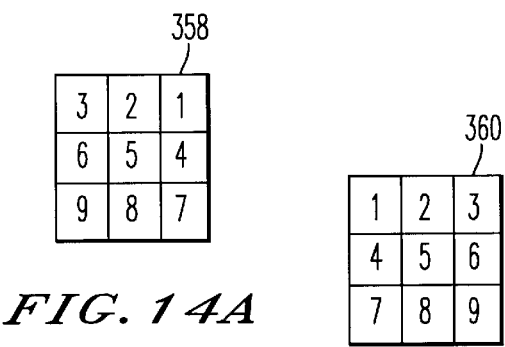
*FIG. 14A*
*FIG. 14B*
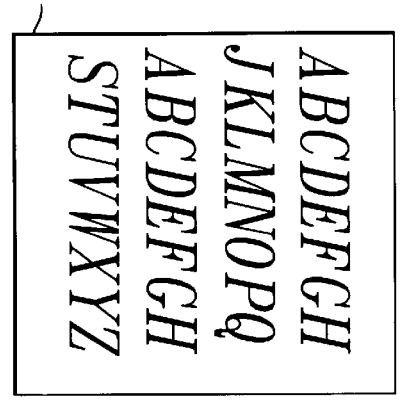
*FIG. 13C*

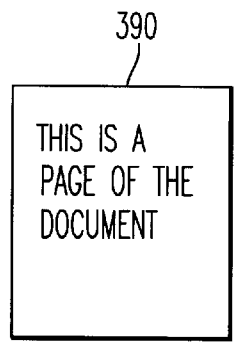
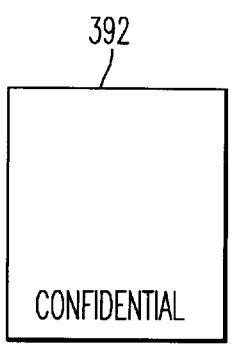
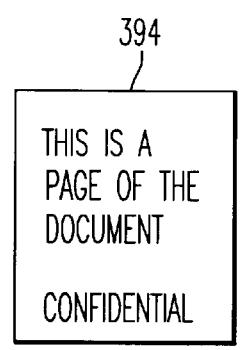
*FIG. 16A*   *FIG. 16B*   *FIG. 16C*
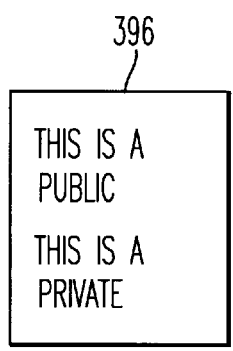
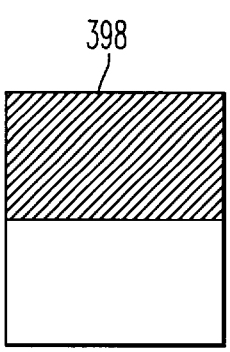
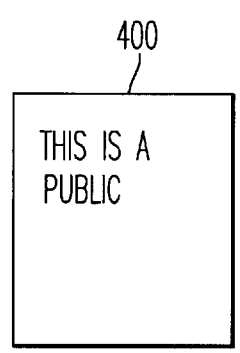
*FIG. 17A*   *FIG. 17B*   *FIG. 17C*
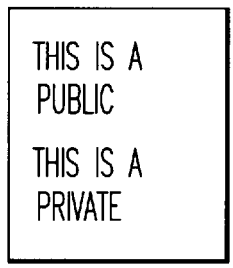
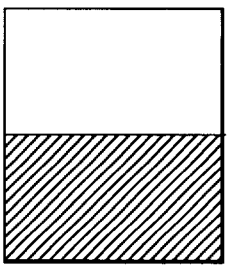
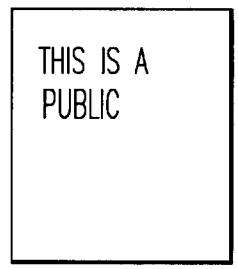
*FIG. 17D*   *FIG. 17E*   *FIG. 17F*

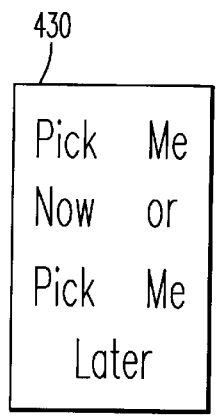
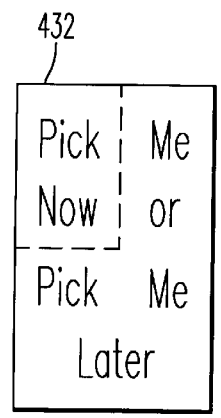
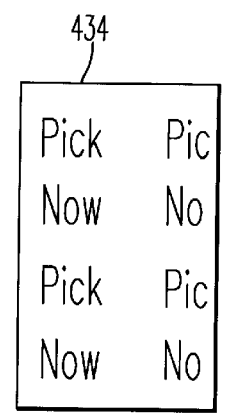
FIG. 19A  FIG. 19B  FIG. 19C
FIG. 20A  FIG. 20B  FIG. 20C
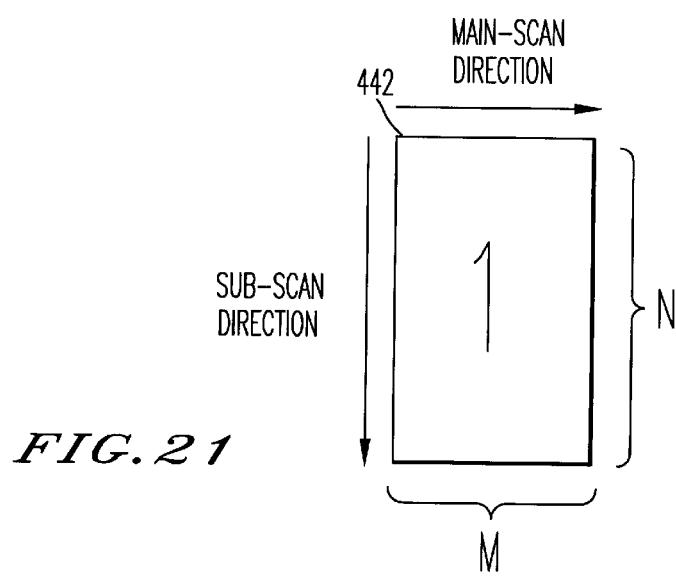
FIG. 21

458

| 20 | 21 | 22 | 20 | 21 | 22 | 20 | 21 |
|----|----|----|----|----|----|----|----|
| 28 | 29 | 30 | 28 | 29 | 30 | 28 | 29 |
|    |    |    |    |    |    |    |    |
|    |    |    |    |    |    |    |    |
|    |    |    |    |    |    |    |    |
|    |    |    |    |    |    |    |    |
|    |    |    |    |    |    |    |    |
|    |    |    |    |    |    |    |    |

| 20 | 21 | 22 | 20 | 21 | 22 | 20 | 21 |
|----|----|----|----|----|----|----|----|
| 28 | 29 | 30 | 28 | 29 | 30 | 28 | 29 |
| 36 | 37 | 38 | 36 | 37 | 38 | 36 | 37 |
| 20 | 21 | 22 | 20 | 21 | 22 | 20 | 21 |
| 28 | 29 | 30 | 28 | 29 | 30 | 28 | 29 |
| 36 | 37 | 38 | 36 | 37 | 38 | 36 | 37 |
| 20 | 21 | 22 | 20 | 21 | 22 | 20 | 21 |
| 28 | 29 | 30 | 28 | 29 | 30 | 28 | 29 |

*FIG. 23D*

DIGITAL COPIER WITH SCALABLE ARCHITECTURE

CROSS-REFERENCES TO RELATED APPLICATION

This application is related to commonly owned co-pending U.S. patent applications Ser. No. 09/191,111 entitled "Digital Copier with an Unified Memory which Stores Computer Instructions and Image Data," and Ser. No. 09/191,113 entitled "Image Manipulation for a Digital Copier which Operates on a Block Basis," both of which were filed concurrently with the present application and are incorporated herein by reference.

BACKGROUND OF THE INVENTION

1. Field of the Invention

The present invention relates to a digital copier or multiple-function image processing device. The invention is more particularly related to the system architecture of the digital copier or multiple-function image processing device.

2. Discussion of the Background

Digital copiers are image processing devices which scan an image, store a digital representation of the image in memory, and print the digital representation of the image. In order to print the digitized images at a rate similar to rates produced by conventional analog copiers which never store a digital representation of the image but use optical components such as mirrors and lenses to generate an image on a photoconductive drum or belt, a very large amount of data must be moved at a high rate of speed through the digital copier. The requirement to quickly move such a large amount of data has pushed the capabilities of current data processing and storage devices to their limits.

In the past, in order to make a digital copier, engineers have only been concerned with the immediately assigned task and were not overly concerned with the future expandability or modifications of the system architecture. The most important goal of prior digital copier systems was to build the most affordable system at the time of design with the necessary capabilities of processing large amounts of data. The result of this design and thought process was a digital copier which was produced at the lowest possible price but could not be easily modified or expanded. For example, conventional digital copiers use a proprietary bus system for communicating data and often have controllers which have the capabilities of handling only the basic copying functions. However, modifications to the system were relatively expensive and limited. The most basic function required to be performed by a digital copier is to copy a scanned image onto a new sheet of paper. However, other functions which may be desired in a digital copier include interfacing the digital copier to a personal computer or network of computers so that a scanned image obtained from the scanner of the digital copier can be provided to the personal computer or network. Similarly, it is desirable to use the digital copier as a printer to print an image from a computer or a computer network. Still further, it may be desirable to use the digital copier as a fax machine. Providing a digital copier with the ability to perform other functions makes the digital copier a multi-function machine. Thus, a multi-function machine may be considered a digital copier and vice-versa.

Because of the desire to make the base price of a digital copier as low as possible, conventional digital copiers required additional controllers such as microprocessors to perform the additional functions. For example, if it is desired to add a facsimile transmission and receiving function to a conventional digital copier, there is typically required the need to add a new facsimile controller to the system. The facsimile controller includes the basic hardware and software functionality and its own processor. The processor used by the digital copying function is typically not relied upon to perform processing duties related to facsimile transmission and receipt. Conventionally, it simply has not been possible to increase the capabilities or modify the capabilities of a digital copier by adding an inexpensive piece of computer hardware to the digital copier and upgrading the control program used by the digital copier. What has been necessary is the addition of a new control unit or controller card having both the hardware and software capabilities for performing the additional functions. The use of this additional controller card results in a duplicity of system components such as an additional, relatively expensive, microprocessor, and also a corresponding program storage memory.

Further, since the addition of components required the addition of tightly integrated hardware and software, the abilities of the added components were not flexible. For example, in a digital copier, facsimile images are transmitted and received at a speed which is far less than the capabilities of the data transmission rates of the digital copier. Thus, the system architecture of a conventional digital copier would permit the addition of two facsimile devices so that two facsimiles could be transmitted and/or received using two different phone lines. However, the demand for such a system would probably be quite low, but a very expensive tightly integrated hardware and software solution would need to be developed, making the commercial viability of such a system having the capability to send and/or receive faxes using two different phone lines quite low and impractical.

SUMMARY OF THE INVENTION

Accordingly, one object of this invention is to provide a novel architecture for a digital copier or multi-function device.

It is another object of the invention to provide a digital copier with a scalable architecture at a reduced cost.

It is a further object of the invention to provide a digital copier which uses a widely available industry standard bus.

It is still another object of the invention to provide a digital copier which uses a PCI bus.

These and other objects are accomplished by a digital copier having a processor, a memory system, a scanner, and a plotter. The architecture of this digital copier contains therein an industry standard bus. In the preferred embodiment, the industry standard bus is a PCI bus. The use of an industry standard bus such as the PCI bus allows readily available computer accessories and peripherals to be easily and inexpensively utilized within the digital copier. The memory system includes a random access memory and a disk drive. The use of a virtual memory system within the digital copier allows the images to be transmitted into and out of the random access memory from and to a mass storage device, such as a hard disk drive.

According to the preferred embodiment of the invention, a single interface card or chip connects both the plotter and scanner to the industry standard bus. This interface has the capability of rotating and flipping, if necessary, scanned images and rotating images to be printed. Additionally, the interface permits the combination of two or more images using logical functions such as ANDing, ORing, or masking.

Other functions carried out by the interface to the standard bus include repeatedly printing a section of the image. These image manipulation functions are performed on small sections of the image so that it is not necessary to wait for the entire image to be contained in memory. Preferably, the small block sizes are of a size which allows a most efficient direct memory access ("DMA") to be performed.

In one embodiment of the invention, a single chip standard bus interface and memory controller is used to interface the random access memory and standard bus, such as a PCI bus, to the microprocessor of the digital copier. In an alternative embodiment, the interface connecting the scanner and plotter to the standard bus is connected to a dedicated local bus having no other devices connected thereto. There is a second industry standard bus such as a PCI bus connected to the other peripherals of the digital copier.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9A illustrates a scanning of the first M lines of the image, FIG. 9B illustrates the rotation of the first block of the image, FIG. 9C illustrates the writing of the first block into the appropriate position in memory, FIG. 9D illustrates the rotation of a second block of the image, FIG. 9E illustrates the writing of the second block into the appropriate position in memory, FIG. 9F illustrates the organization of the memory after all six blocks have been rotated, and FIG. 9G illustrates the rotated image generated using the data as arranged in FIG. 9F;

FIG. 12A shows the sub-scan direction being from the top of the drawing figure to the bottom of the drawing figure, and FIG. 12B illustrates the image resulting from the scan of FIG. 12A;

FIG. 13A illustrates the sub-scan direction proceeding from the bottom of the drawing figure to the top of the drawing figure, FIG. 13B illustrates an image resulting from the scan of FIG. 13A, and FIG. 13C illustrates the image of FIG. 13B flipped about an axis parallel to a sub-scan direction;

FIGS. 14A and 14B illustrate image pixels within a block of an image which are flipped with respect to each other;

FIG. 16C illustrates the result of ORing of the images of FIGS. 16A and 16B;

FIG. 17C illustrates the result of masking the image of FIG. 17A using the mask of FIG. 17B;

FIG. 17F illustrates the result of masking the image of FIG. 17D using the mask of FIG. 17E;

FIG. 19A illustrates an image, FIG. 19B illustrates the selection of a portion of the image to be repeated, and FIG. 19C illustrates an image generated using a repeating of the section selected in the image of FIG. 19B;

FIG. 20A illustrates an image, FIG. 20B illustrates a half of the page of the image being selected, and FIG. 20C illustrates the results of the image repetition function performed based on the selection in FIG. 20B;

FIG. 21 illustrates the main-scan and sub-scan directions of a block of an image on which an image repeating function is to be performed;

FIGS. 23A–23D illustrate the process of writing an image containing the portion which is to be repeated.

DESCRIPTION OF THE PREFERRED EMBODIMENTS

Figure 1:
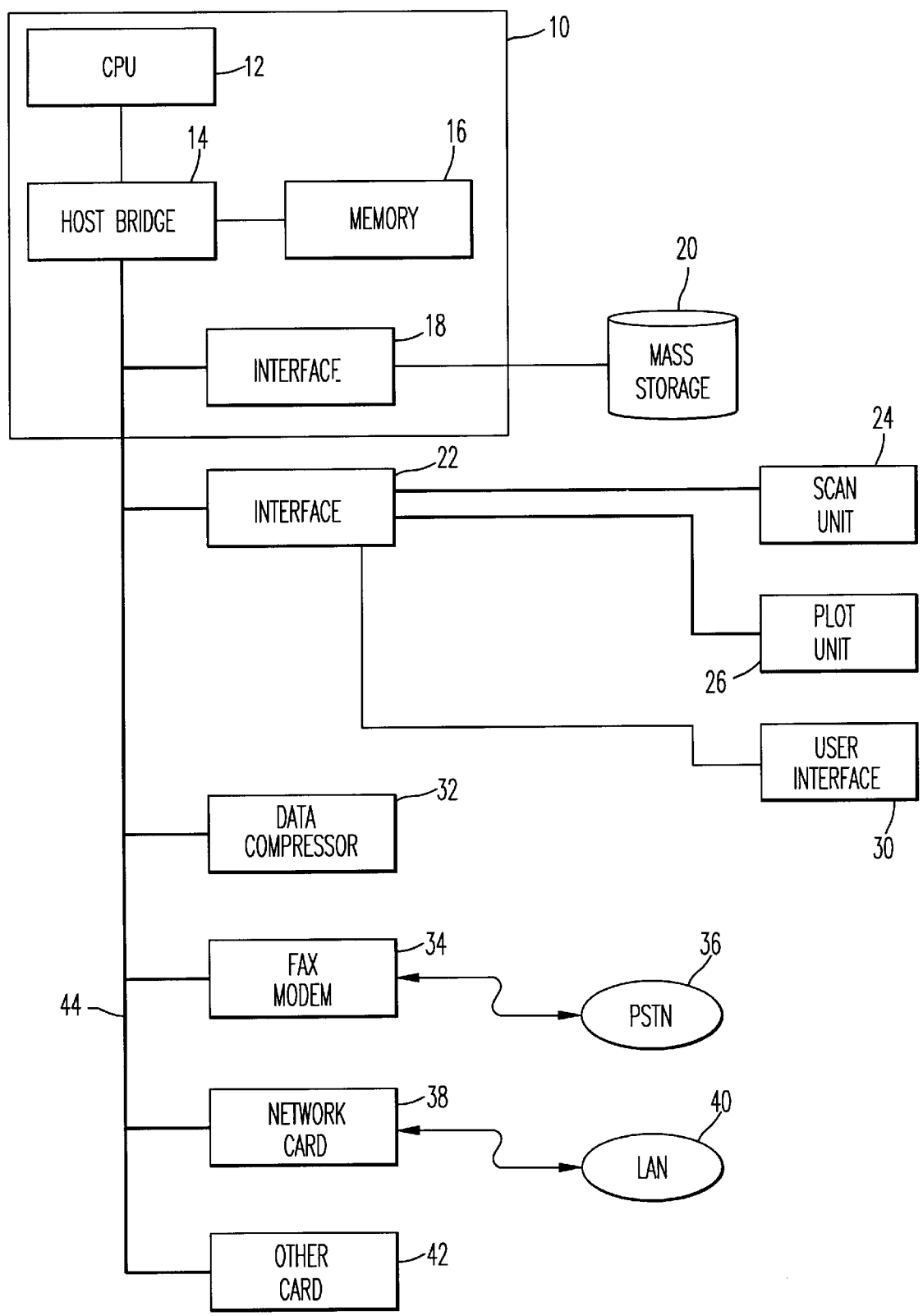
FIG. 1 illustrates a system diagram of a digital copier according to the invention.

Referring now to the drawings, wherein like reference numerals designate identical or corresponding parts throughout the several views, and more particularly to FIG. 1 thereof, there is illustrated the system architecture for a digital copier or multi-function device of the present invention. A digital copier is a device which has the capability of scanning an image and creating a digital representation of the image, storing at least temporarily the digital representation in a memory or buffer, and printing the digital representation of the image. A digital copier is a special purpose device and is preferred to have the capability of copying at least 10 to 15 pages per minute ("ppm"), although the present invention is designed for a copy speed of approximately 45 ppm but the system may be as slow as 35 ppm or as fast as 55 ppm, although any desired speed including speeds higher than 55 ppm and slower than 35 ppm may be accomplished by the architecture of this invention. In FIG. 1, there is a motherboard 10 having mounted thereon a CPU 12, and a host bridge 14 which interfaces the CPU 12 to the system bus 44 and the memory 16. The CPU 12 may be implemented as any type of processor or microprocessor and the preferred implementation of the invention utilizes a NEC VR4300 RISC microprocessor, although any other microprocessor may be used with this invention including later developed NEC microprocessors, microprocessors from Intel, Motorola, Hitachi, or any type of microprocessor or processor from any manufacturer. The motherboard 10 may be implemented in any desired manner including using a PC compatible motherboard with a Pentium compatible processor (or higher), or other type of processor. While the motherboard 10 has been illustrated, the system does not require and should not be limited to such a motherboard structure or organization. For example, if desired, all interfaces to the PCI bus may be through PCI bus slots on the motherboard 10. Alternatively, the devices of FIG. 1 may be connected without the use of a motherboard.

The host bridge 14 functions as a memory controller for a memory 16, and is also the host bridge or interface between the bus 44 and the CPU 12. In the preferred embodiment of the invention, the host bridge 14 is implemented as the NEC VRC4373 PCI bridge and memory controller, although the invention should not be limited to this host bridge and memory controller. In the preferred embodiment of the invention, the DMA (direct memory access) operation is controlled by the device transferring data. For example, the DMA operation is preferably controlled by an interface 22 when transferring data from or to a scan unit 24 or a plot unit 26. In the preferred embodiment of the invention the DMA transfers are performed in blocks of 32 bytes. In accordance with a 32 byte DMA transfer size, the DMA buffers may also be implemented as 32 bytes in size. Transfers which are 32 bytes in size are a convenient size as smaller blocks of an image which are processed within the interface 22 are also preferably 32 bytes. However, the size of the DMA transfers may be any desired size, whether bigger or smaller than 32 bytes. The size of the DMA transfers, and/or the buffer(s) used for the DMA transfers are chosen based on the system architecture. Typically, the data transferred by the DMA operation is read from a buffer at the transmitting device and written to a buffer at the receiving device. DMA transfers may occur between any of the devices connected to the bus of 44 of FIG. 1. Factors which may be examined, if desired, in determining the size of the DMA transfers include the size of the data which is being accessed, the transfer burst length such as the burst length of the bus, and the access capability. These are non-limiting factors and any other factor may be utilized to select the DMA transfer capabilities and parameters. Transferring data in blocks of 32 bytes in the system of FIG. 1 results in a very efficient transfer of images. Thus, a function of this invention is to transfer (and process) the images in blocks which have the same size as the buffer of the DMA controller. It would also be efficient, although probably not as efficient, for the block size used when processing images to be a multiple of the DMA buffer size or alternatively be evenly divisible into the DMA buffer size. For example, the block size may be 64 bytes or alternatively 16 bytes for a 32 byte DMA buffer. Alternatively, any other block size or DNA transfer size may be used. The design specifications, functions, and capabilities of the NEC VRC4373 PCI bridge and memory controller as set forth in publically available documents are incorporated herein by reference.

The host bridge 14 interfaces to the bus 44 which is a standard bus and more preferably a PCI bus. A standard bus, or industry standard bus, is a bus which meets a standard. A standard is defined as indicated in the Computer Dictionary of the Microsoft Press, 1997, which is incorporated herein by reference. A standard may be either of two different types of standards. A first type of standard is a de jure technical guideline advocated by a recognized noncommercial or government organization that is used to establish uniformity in an area of hardware or software development. The standard is the result of a formal process, based on specifications drafted by a cooperative group or committee after an intensive study of existing methods, approaches, and technological trans and development. The proposed standard is later ratified or approved by a recognized organization and adopted over time by consensus as products based on the standard become increasingly prevalent in the market. The PCI bus standard is a type of de jure technical guideline standard. Alternatively, a standard may be a de facto technical guidelines for hardware or software development that occurs when a product or philosophy is developed by a single company and, through success and imitation, becomes so widely used that deviation from the norm causes compatibility problems or limits marketability. This type of highly informal standard setting is exemplified by Hayes-Compatible modems and IBM PC-compatible computers.

In the preferred embodiment of the invention, the standard bus 44 is implemented using a PCI bus standard. A PCI bus is a bus which has been developed and approved by the PCI Special Interest Group (SIG). This definition includes PCI specifications which have been approved by the PCI SIG at the time of this writing, and also PCI busses which are later approved. Currently, the PCI Specification Revision 2.1 is approved as is the PCI to PCI Bridge Specification Revision 1.0 are approved by the PCI SIG and are incorporated herein by reference. Additionally, the final draft of the PCI bus specification ver. 2.2 is in existence, may be utilized by the invention, and is incorporated herein by reference. Still further, two new PCI bus specifications have been reviewed and are in the process of being approved, including the PCI-X specification and the Mini PCI specification which are both incorporated herein by reference. Further, any bus which accepts PCI compatible cards or interfaces may also be considered a PCI bus. In the preferred implementation of the invention, the bus is 64 bits wide and operates at 66 MHZ, although speeds faster and slower and widths wider and narrower may be used for the bus. In the preferred embodiment of the invention, the PCI bus 44 is directly connected to the host bridge 14 which is directly connected to the CPU 12. Thus the bus 44 may be mounted at least partially on, or alternatively is mounted completely on, the motherboard 10. In one embodiment of the invention, the bus 44 is a PCI bus, but in other embodiments of the invention, the bus 44 may be implemented as any other desired bus meeting the designer's or user's requirements, and may or may not be an industry standard bus.

The memory 16 is a work area memory and/or random access memory ("RAM") utilized for storing both computer instructions which are executed by the CPU, and also for storing images which are processed. The memory 16 may be any type of memory including fast page DRAMs, EDO RAMs, synchronous DRAMs, and flash memory or any combination thereof. While not specifically illustrated in FIG. 1, the motherboard will usually have some type of boot memory used when booting-up, powering on, or resetting the digital copier. The boot memory utilizes some type of nonvolatile memory such as a flash memory or flash ROM, ROM, a disk or other nonvolatile memory. The boot memory may be part of the memory 16, may be a different memory connected to the host bridge 14, may be included within the host bridge 14, may be connected between the CPU 12 and the host bridge 14, may be connected directly to or be part of the CPU 12, or may be at any desired location. The memory 16 may be implemented using one or more memory chips which may be semiconductor memory chips. Thus, the present invention includes storing both image data and computer instructions in the same memory chip. The invention may also be implemented such that a range of physical addresses used for storing images is next to a range of physical addresses used for storing computer instructions.

A novel feature of the system architecture of FIG. 1 is the use of a unified memory 16 for storing both image data and instructions for the CPU 12. The use of the concept of virtual memory allows the system to efficiently use a limited amount of RAM in the memory 16 and store both the image data and the instructions. Data stored within the memory 16 may be paged into and out of a mass storage device 20 such as a hard disk drive connected to an interface 18. The virtual memory system dynamically allocates the memory 16, between the computer instructions and image data, as needed. The virtual memory system is implemented utilizing the CPU and the operating system of the CPU. Thus, the CPU or the CPU in combination with the operating system may be considered a virtual memory controller. Alternatively, the virtual memory controller may use additional components, or may be separate from the CPU, if desired. In the preferred embodiment of the invention, the operating system utilized is LINUX and may be implemented using, for example, version 1.3.94, although any other version of LINUX, or any other operating system may be used including a Windows operating system from Microsoft. The allocation of the memory 16 for computer instructions and image data may change, as desired, in order to efficiently implement the invention. For example, instructions for the CPU 12 may be paged out of the memory 16 so additional image data can be paged into the memory 16, and vice-versa. Further details of the implementation and use of virtual memory, as may be used with the invention, are set forth in the books entitled "The Indispensable Pentium Book," by Hans-Peter Messmer, published by Addison-Wesley, 1995, at pp. 207–218, and "Computer Architecture and Parallel Processing" by Hwang et al, 1984, at pp. 80–98, which are both incorporated herein by reference.

While the virtual memory system of this invention swaps computer instructions (code) and image data into and out of the memory 16, it is preferable at times, and may even be required, to keep specific code and data in the memory 16 (e.g., lock sections of memory in the memory 16 so that they are not subject to paging or swapping). Such code and data may be parts of the operating system. Application code and data are normally subject to swapping and paging in their entirety. A large part of physical memory (e.g., memory 16) is conceptually segmented by the operating system into a set of frames of a predetermined size. This part of the physical memory is usually referred to as the paged memory. Applications, as well as the operating system, may be programmed in an abstract address space. The compiler and linker, together, assign virtual addresses to the various code and data segments generated by the compilation and linking of such programs. The addresses are assigned such that the program objects reside in a contiguous linear address space, which has a beginning and an end. This entire address space, which is exclusive to a process, is also conceptually segmented by the operating system into a set of "pages," which are preferably the same size as the size of the "frame." When required, the operating system places the required "page" into a "frame" and conditions a Memory Management Unit (MMU) to perform address translation during a reference. This entire mechanism and operation is not visible to the application program.

The operating system reserves a certain amount of physical memory for its own dedicated use and places essential objects for its operation in that area of memory at boot time. This area is not subject to paging. It is usually referred to as the non-paged memory. During activation of an application program, the operating system places a few pages of the application code and data in the physical memory frames, chosen arbitrarily, and sets up the MMU for address translation. This initial set is commonly referred to as the working set. Once the application starts execution, it may make a reference to a virtual address for which the operating system may not have set up the translation in hardware. When a such a reference occurs, an exception occurs. Such exception events are known as page-faults. When a page-fault occurs, the operating system intervenes and services the page-fault. Such a service includes the operations of (1) figuring out the location of the page into which the reference was made, (2) placing the required page from the hard disk into an available physical memory frame, (3) installing an address translation for the new page into the MMU hardware, and (4) resuming execution of the application process.

The operating system keeps a "page-table" to help speed up the page-fault servicing as well as to hold several associated flags that it uses to ensure proper operation and integrity of applications code and data. For large address space machines, such as modem microprocessors, a single page table can be very long and may tie up a large amount of physical memory. Hence, several page-sized page-tables may be used, so that page-tables themselves can be paged. A hierarchy of page-directories is used to keep track of all the page-tables. Often, the operating system may have the need to free up physical memory page frames. It does so by evicting a page from a chosen frame to the hard disk. The number of pages resident in physical memory at any given time for any given process, or even for the operating system is dynamically controlled by the operating system. based on the needs at that time. If the system starts running of out physical memory due to any reason, it usually frees up physical memory through an operation called swapping or paging. It may be desirable to keep certain pages from being swapped out of physical memory. For example, it is known that image data within the DMA buffers will eventually (or immediately) be needed. Thus, this image data can be allocated in the physical memory and never released i.e., put it in non-paged memory. However, since application programs need access to this data, it must also be accessible from the virtual address space. Still further, more than one application may need the same data concurrently. One solution for this is to copy data from kernel space (non-paged memory) to user space. That is fairly inefficient so there may be mapping of the physical DMA buffers into the requesting process's address space as needed, when needed. However, such mapped pages should not be subject to paging.

The mass storage device 20 of FIG. 1 is preferably implemented using a hard disk drive, although any other type of mass storage drive may be utilized including a drive such as a magneto-optical disk drive, or other readable/writeable storage drive. The mass storage device 20 is connected to the bus 44 utilizing the interface 18. The interface 18 may be built into the mass storage device 20, if desired.

The interface 22 is one of the features of the invention which allows the efficient implementation of a digital copier. The interface 22 provides a single interface to the bus 44 of both the scan unit 24 and the plot unit 26. In one embodiment, the plot unit 26 does not have the ability to generate a rasterized image or process commands such as the commands of the printer languages PCL and PostScript. Instead, the image data is transmitted to plot unit 26 in a rasterized format. Alternatively, the plot unit 26 may be capable of generating a rasterized image and may be capable of processing PCL and/or PostScript commands. Basic processing capabilities such as image rotation, image overlay, and image repetition are preferably carried out in the interface card 22, as explained in detail below. The basic functions and movement of the scan unit 24 and the plot unit 26 are controlled using respective engine controllers included therein. The location of the respective controllers may be anywhere and is preferably within the digital copier. There is no requirement for the plot unit 26 and scan unit 24 to be in different housings, although this arrangement may be utilized. Also connected to the interface 22 is a user interface 30 which allows the user to input commands to control the copying, printing and facsimile functions and also used to display information or any type of message to the user.

The PCI bus 44 may have any conventional component connected thereto. The advantage of utilizing a standard bus such as a PCI bus within the digital copier is that any type of component which is compatible with the standard bus 44 may be quite easily and usually inexpensively utilized in the digital copier. Examples of such readily available and inexpensive cards which may plug into the PCI bus include network cards and fax modem cards, although any other type of card or component may be utilized. Further, in ordinary situations, the CPU 12 may handle the processing which is required by the additional peripherals or cards connected to the standard bus 44. The software solution of this invention does not require the software to be highly integrated with the added peripheral or card but the software may be simply loaded onto the mass storage device 20 for execution by the CPU 12.

In order to efficiently operate the digital copier, it is desirable to compress the data representing images. Thus, there is a data compressor 32 which is utilized to compress and decompress the image data. Any type of data compression including lossless or lossy compression algorithms may be utilized or a combination thereof may be utilized. Examples of image compression which may be utilized include compression based on the Lempel-Ziv adaptive compression algorithm, compression based on the Adaptive Lossless Data Compression ("ALDC") algorithm, or a Reed-Solomon Forward Error correction algorithm, or any other type of data compression and decompression may be utilized. Various data compression products which may be used as the data compressor 32 are commercially available from the company Advanced Hardware Architectures, Inc. located in Pullman, Wash.

The digital copier or multi-function device of the invention may include a facsimile function. In order to implement communication with other facsimile machines, there is a fax modem 34 connected to the bus 44. The fax modem communicates over a public switched telephone network ("PSTN") 36. Alternatively, any other communication medium may be used to communicate facsimiles including an ISDN ("Integrated Switched Digital Network") or the Internet. Scanned images may be transmitted out of the digital copier and images to be printed may be received by the digital copier through a network card 38. The network card 38 is connected to a LAN (Local Area Network) 40, although the network card may also be connected to a Wide Area Network or the Internet, if desired.

The digital copier may include one or more other card 42 connected to the bus 44. This other card 42 may be implemented as any type of peripheral or device which plugs into the bus 44 and may be utilized to connect a second fax modem card within the digital copier, or may also be utilized to interface other storage drives such as a floppy disk drive or a CD ROM drive for loading new software into the digital copier to upgrade, enhance, or change the functions performed by the CPU and the digital copier. The standard bus 44 allows the interfaces and cards plugged therein such as the peripherals 32, 34, 38 and 42 to be off-the-shelf products which are readily available and inexpensive. Such readily available products, especially for a PCI bus, make the architecture of the present invention highly desirable and allow a reduced cost of the digital copier and flexibility and scalability of the system.

The digital copier of the invention may utilize an automatic document feeder to feed pages to be scanned over the scanning device of the scan unit 24. The automatic document feeder may be implemented to accept a stack of pages face-up and then rotate the images face-down as they are being scanned. Alternatively, the automatic document feeder may receive the stack of pages in a face-down orientation and then there would be no need to rotate or invert the physical pages before scanning. Additionally, the plot engine and scan engine may be implemented in any desired manner including by using conventional technology, if desired. Example plot and scan engines which may be utilized with the invention are set forth in U.S. Pat. No. 5,819,110, which is incorporated herein by reference. It is also noted that the plot engine and scan engine may be implemented using the same or different housings.

The general system design of this invention provides the performance of real-time responsiveness while utilizing the concept of a unified memory which is novel in a digital copier. However, the system requirements become more stringent as the system throughput requirements increase. For example, a 45 cpm copier may require a response to real-time events much quicker than a 10 cpm copier may need. The real-time response provided by this invention means that the controller has a limited, usually very small, time to react to an event that occurs in real-time during an operation. This requirement arises out of the fact that other parts of the system should not be stalled due to a lack of response.

In order to achieve the desired response time, the embodiment of invention having a unified memory may utilize one or more or the following features, and these features may also be applicable with the other embodiments of the invention. In order to increase the speed of the system it is desirable to remove as much of the time-critical requirements from the system as possible through careful design of the system. Exemplary features which can be used to increase system speed include the following concepts: make the highly time-critical operations be managed by the engine (e.g., scan or plot engines) interface hardware (e.g., interface 22) near the engine and/or as close to the engine as possible; make less time-critical operations interrupt-driven; provide sufficient buffering in the engine interface hardware such that the controller can respond to events without causing any disruption of the data flow; move data from the engine interface buffers to the main memory 16 through DMA operations, manage DMA events through interrupts, prioritize interrupts so that events requiring urgent service can be serviced in time, influence process scheduling in the operating system through prioritized interrupts, make interrupt latency as small as possible through the use of DPCs (Deferred Procedure Calls), make time-critical execution paths through the operating system as well as the application software as short as possible, avoid copying of data as much as possible, and use references through virtual memory mapping.

Figure 2:
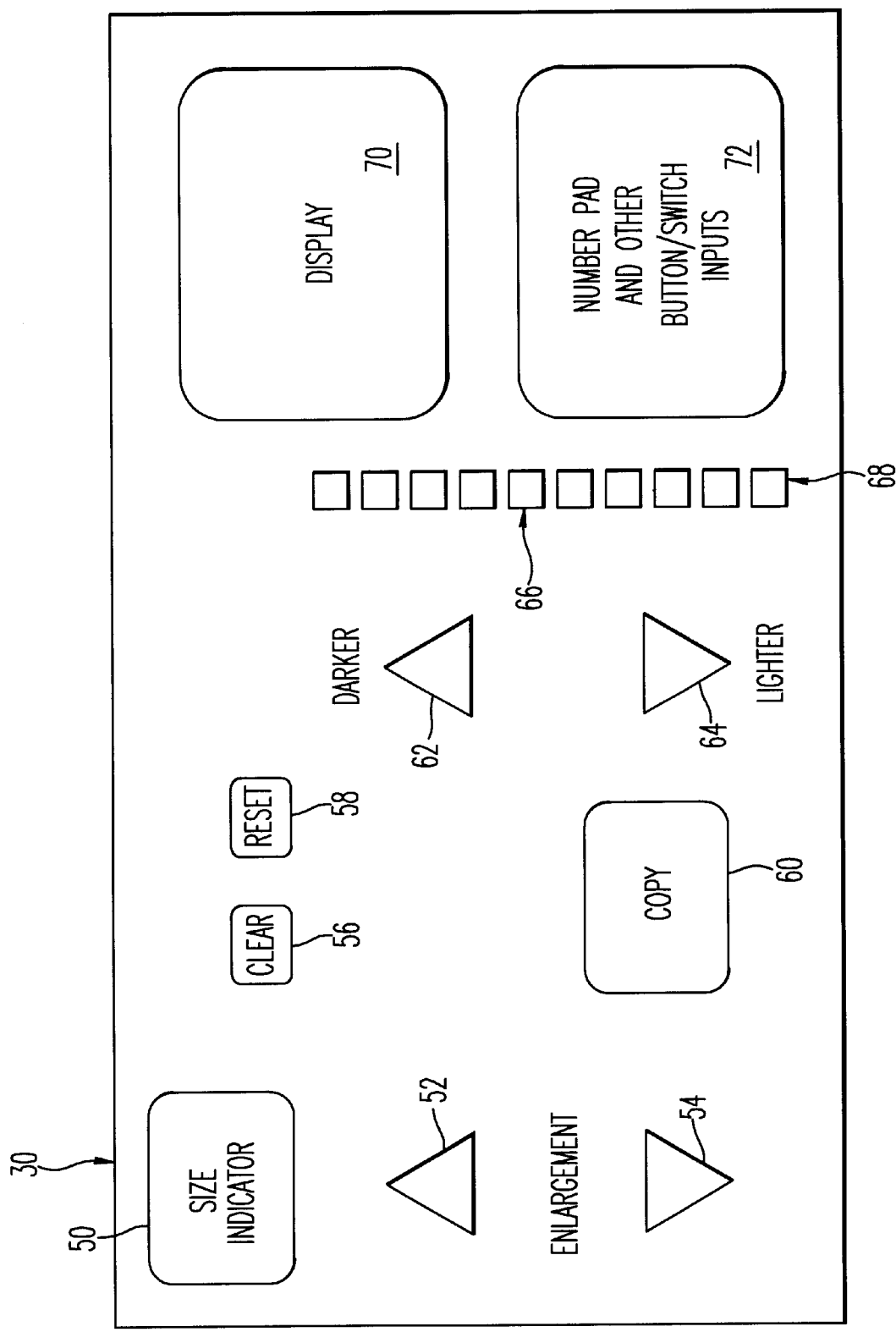
FIG. 2 illustrates the user interface 30 of FIG. 1.

FIG. 2 illustrates the details of the user interface 30 of FIG. 1. The user interface 30 includes a size indicator 50 which is a display of how much the image generated by the digital copier is to be enlarged. For example, no enlargement would be indicated by a size of 100%, some enlargement would be a size of 110%, and a reduction in size would be 90%. An up button 52 increases the enlargement and a down button 54 reduces the size. There is a clear button 56 to clear a current copy operation, a reset button 58 to reset the parameters of the copier to default parameters, and a copy button or key 60 which commands the start of a copy job.

The print density of the images generated by the copier or multi-function device is controlled by a lighter button 64 and a darker button 62. Each time one of these buttons or switches is pressed, an indicator light such as one of the plurality of LEDs 68 moves one space in a direction corresponding to the key which was pressed. There is a mark 66 which indicates a default position or a value of zero for the density. The user interface 30 further includes a display 70 which may be implemented as a Liquid Crystal Display ("LCD"), for example, and is used for displaying any type of information of the copier such as the parameters of the copier including the number of copies to be made, copying operations, and diagnostic or error information of the copier including paper jams. Since the digital copier of the present invention may include multiple functions and may be a multi-function machine, a display 70 is also capable of displaying information related to these other functions such as all information related to a facsimile send or receive function including the telephone number to which the facsimile is to be transmitted, and the identification or telephone number which is transmitted from the remote facsimile machine, whether the remote facsimile machine is in a transmitting or receiving mode. Further, as the digital copier may function as a printer or scanner, the information associated with the printing and scanning functions may also be displayed. The user interface 30 further includes a number pad and other button/switch inputs 72 which includes keys to enter any of the ten digits 0–9 in order to select a number of copies, for example. Further, other buttons and switches related to other functions of the device, such as scanning and printing functions may be included on the number pad and other button/switch inputs 72.

Figure 3:
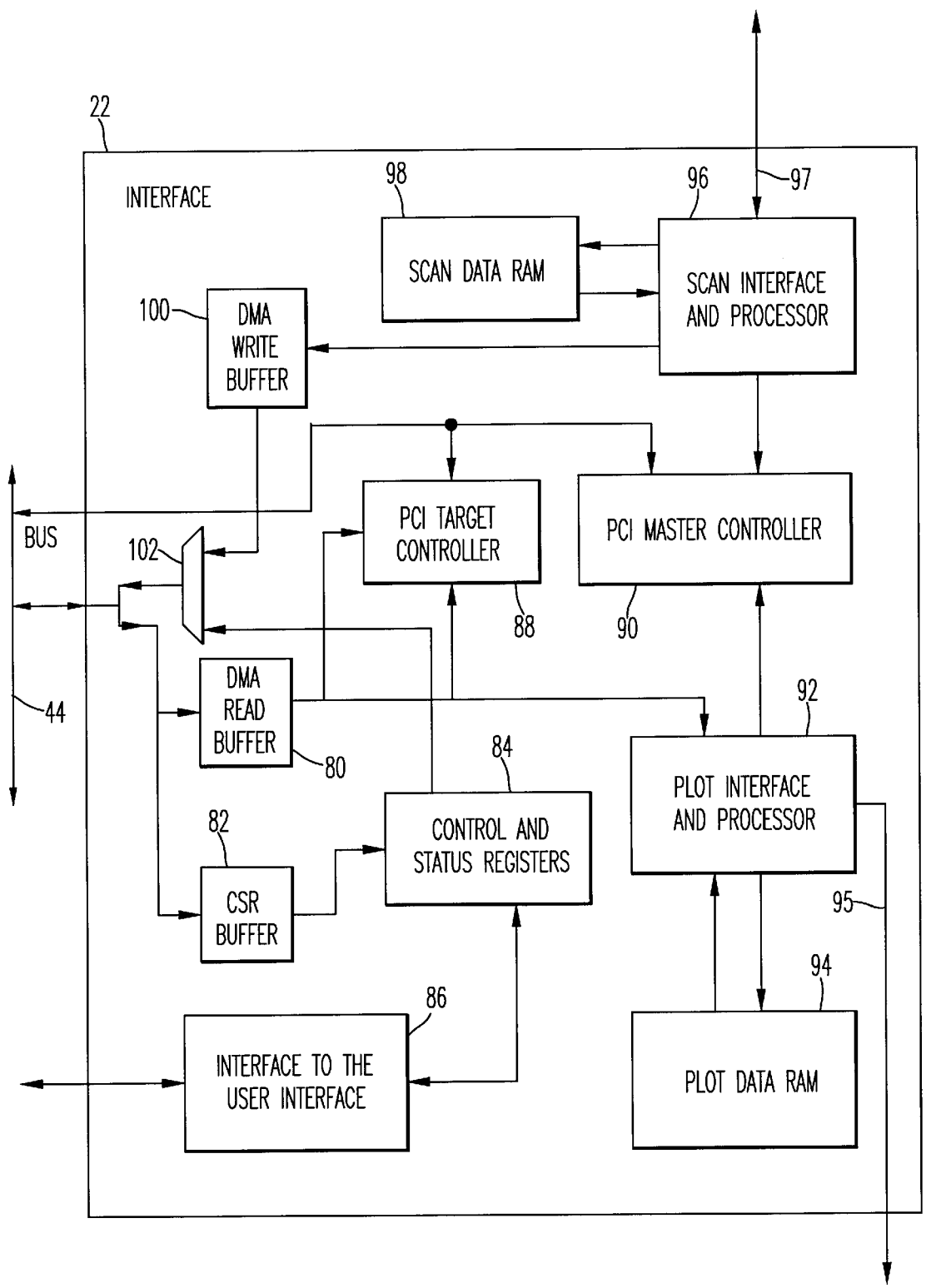
FIG. 3 is a block diagram of the interface 22 to the scanner and plotter illustrated in FIG. 1.

FIG. 3 illustrates in block diagram format components within the interface 22. The interface 22 is preferably implemented on a single chip or ASIC, although any desired structure may be utilized to construct the interface 22 including a plurality of semiconductor devices and/or interconnection of conventional circuit components. Data to the interface 22 arrives from the bus 44 and is transferred to either a DMA read buffer 80 or a Control and Status Register (CSR) buffer 82. The image data is preferably transferred to the interface 22 for printing on the plot unit 26 or transferred from the interface 22 when originating from the scan unit 24 using a DMA operation. Incoming image data transferred into the interface 22 is transferred in using the DMA operation and is written to the DMA read buffer 80. Other information such the control and status information used to control the operation of the interface 22 may arrive at the interface 22 without performing a DMA operation and is thus written into the CSR buffer 82. From the CSR buffer, the control and status information is written to the control and status registers 84. The control and status registers 84 may be utilized to control not only the operation of the interface 22 but also the operation of the digital copier. For example, the number of copies, print density, magnification and other information related to the copying, scanning and/or printing operations may be stored in the control and status registers 84. The data stored in the control and status registers 84 may originate from the CPU 12 of FIG. 1 or other device on the motherboard 10. Alternatively, the data of the control and status registers 84 may originate from the user interface 30 after passing through an interface 86 which links the user interface 30 to the interface 22. The control and status registers 84 control the general operation of the digital copier and various components of the interface. Therefore, the control and status registers 84 are preferably accessible to a plot interface and processor 92 and a scan interface and processor 96. Additionally, the control and status registers 84 may also be available to a PCI target controller 88 and a PCI master controller 90, explained below.

Incoming image data is written to the DMA read buffer 80. This buffer, while serving as a temporary storage data for incoming image data to be printed, also may be utilized to perform logic operations. For example, the present invention may be implemented to perform an ORing, an ANDing, and a masking function, which are explained below. These logical operations are preferably performed by writing a first image into the DMA read buffer 80, and subsequently performing the logical operation by writing the second image over or combining the second image with the image which already exists in the DMA read buffer 80 in order to perform the desired logical operation. The DMA read buffer 80 is preferably the same size as a corresponding buffer of the host bridge 14 of FIG. 1 which is 32 bytes, although any other size buffer or DMA transfer size may be utilized, as desired. The logic operations performed by the DMA read buffer are performed based on the control and status information stored in the control and status registers 84, although other types of controlling logic or functions may be implemented in any desired manner.

The PCI target controller 88 and PCI master controller 90 are generally known devices and are utilized to control communication to and from the interface 22 over the bus 44. The PCI target controller 88 is utilized for initialization and set-up of memory transfers while the PCI master controller 90 is utilized to control high speed and direct memory access utilizing the bus 44. While not illustrated in FIG. 3 in order to reduce clutter, the control and status registers 84 are accessible to the various devices of FIG. 3 including the PCI target controller 88, the PCI master controller 90, the plot interface and processor 92, and the scan interface and processor 96, in addition to the interface 86.

The plot interface and processor 92 controls the data delivery to the plot unit 26 over a port 95, although any desired connection path may be used including wires, a fiber optic cable, or a bus. The plot interface 92 also controls a macrorotation of the images (a reading or writing of blocks of image data to and from the appropriate location), a microrotation of the individual blocks, an image repetition function, and the DMA operation. A plot data RAM 94 stores image data before transmission to the plot unit 26. When performing a logical operation on the image data such as rotation of the image data is performed, a block of the image data is read from the DMA read buffer 80 utilizing the plot interface and processor 92 and the plot interface and processor 92 controls the rotation of this block of data. The data is subsequently written into the plot data RAM 94, in the rotated orientation, if desired. Data is transmitted to the plot unit 26 which includes an engine controller. Thus, the plot interface and processor transmits over the port 95 to the plot unit 26 both image data and control data, and also a clock signal for proper synchronization.

Similar to the plot operation, the scan interface and processor 96 controls a DMA operation of image data obtained from the scan unit 24 over a bus 97, and also controls manipulation of this image data such as rotation of the data. When the data is received from the scan unit 24, it is first written to the scan data RAM 98. When transferring this data out of the interface 22 to the memory 16 or the mask storage device 20, for example, the image data is read from the scan data RAM in blocks, rotated and/or flipped by the scan interface and processor 96, and transferred to a DMA write buffer 100. The outgoing image data from the DMA write buffer 100, outgoing control and status information from the control and status registers 84 are transferred to a multiplexer 102 which transmits data to the bus 44.

Various image manipulation functions are performed by the digital copier of the present invention. However, to copy images at a preferred rate of 45 ppm, it is desirable to perform the image processing functions as rapidly as possible and preferably, without waiting for acquisition of an entire image. Thus, it is desirable to process the image in smaller regions or blocks. It is to be noted that the principles of this invention are also applicable and may be applied to both faster and slower systems and machines. An efficient manner of accomplishing the desired image processing is to perform the image processing as the image data is being obtained from the scanner, or alternatively, as the image data is being sent to the printer. By performing the image manipulation as the image is being obtained from the scanner or written to the printer, extra or dedicated steps of reading the image data into and out of memory can be avoided along with extra steps which would be necessary to move the data across the bus. The transferring of image data across the system bus in a conventional manner for the sole purpose of the image manipulation results in a large burden on the computing resources.

Figure 4:
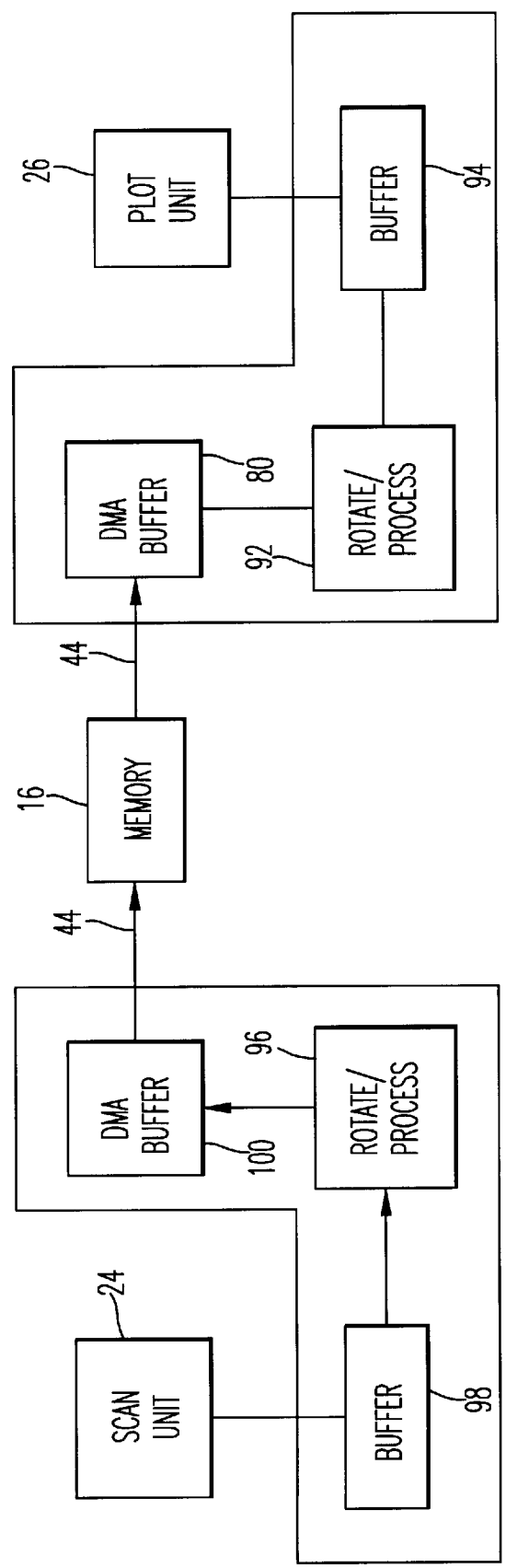
FIG. 4 is a diagram showing the data flow for image manipulation.

FIG. 4 illustrates the data path in the present invention used for image manipulation. In FIG. 4, image data is obtained from the scan unit 24 and written to the buffer 98. A device 96 for controlling the rotating or other processing of the image data reads the image data from the buffer 98 and writes the processed data to the DMA buffer 100. The processed data which may be rotated or flipped data, for example, is transferred to the memory 16 over the bus 44 using a DMA operation, for example. Thus, in order to write processed data into the memory of the digital copier, only one trip across the bus 44 is required. Similarly, when reading the data out of the memory in order to print the data, the image data is read from the memory 16 and travels across the bus 44 using a DMA operation, and is written to the DMA buffer 80. The image is processed as needed such as by performing a logical operation on two or more images, and/or rotation or repeating a section of an image, as explained below, by the device 92. From the device 92, the processed data is written to the buffer 94 and ultimately transferred to the plot unit 26 for printing.

In contrast to the data flow illustrated in FIG. 4, conventional systems may transfer the unprocessed data directly to the memory of the processor from the scanner without being processed. Then in order to process the image data, the data must be read out of the memory, processed, and written back into memory. In this case, there are two extra traverses across a bus as compared to the data flow of this invention.

If the invention transfers data from the scanner first to the data compressor/decompressor 32 before being written to the memory, there will be two traverses of the image data in order to get the image data to the main memory. First, the image data will be transferred from the DMA buffer 100 to the data compressor/decompressor 32, and second the data will be transferred from the data compressor/decompressor 32 to the memory 16. Similarly, in order to decompress the image data, there will be two traverses across the bus in order to first decompress the image data and then to get the decompressed image data from the data compressor/decompressor to the plot unit 26. While the compressing and decompressing results in an extra traverse of the bus 44, such an extra step would also be required in conventional systems, if such a conventional system were to have a compression and decompression scheme similar to that used by the invention.

Figure 5:
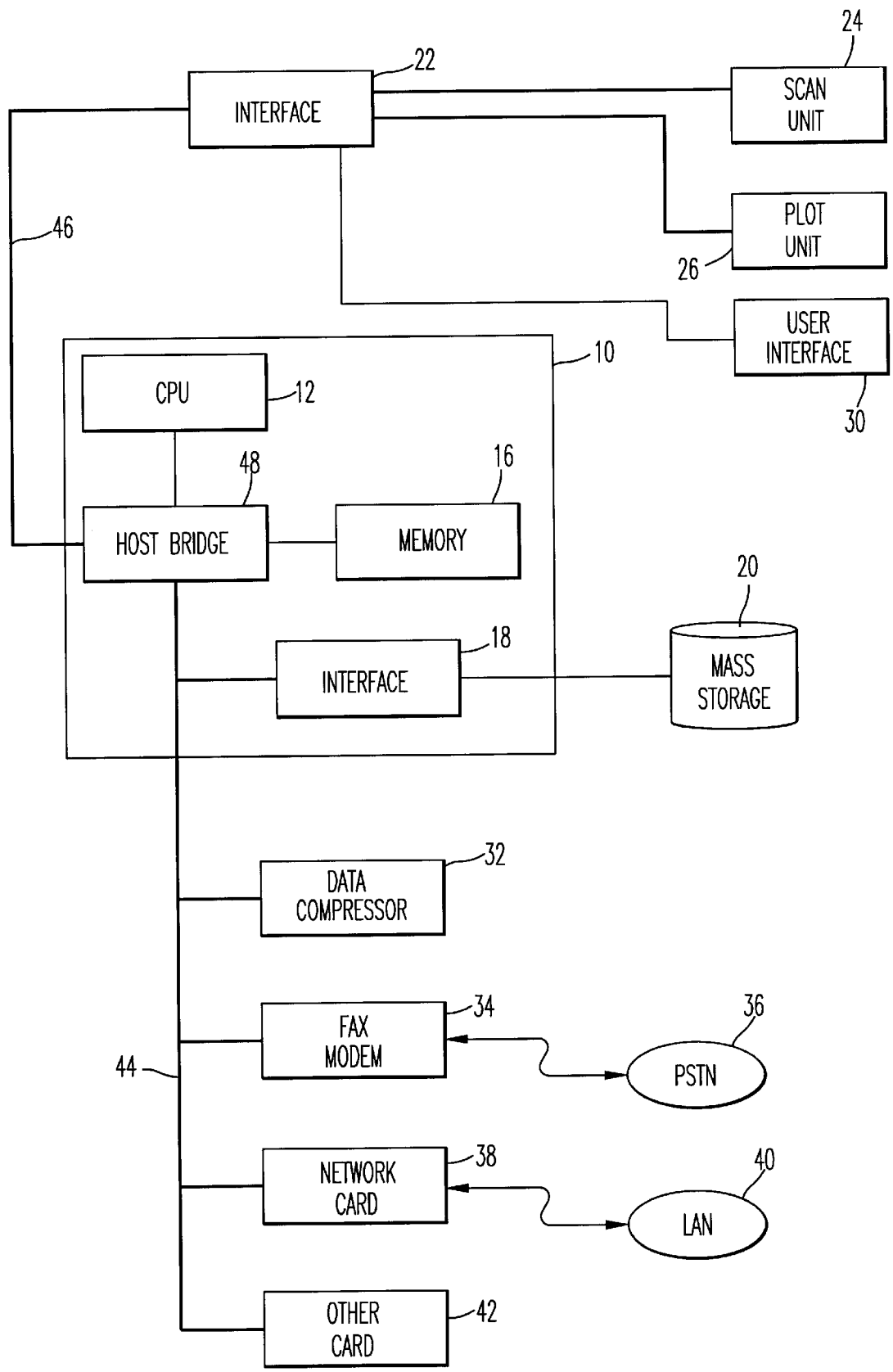
FIG. 5 is an alternative embodiment of the invention using a separate bus to connect the scanner and plotter to the host bridge 14.

FIG. 5 illustrates an alternative embodiment of the invention. In this embodiment, the interface 22 which is connected to the scan unit 24, plot unit 26, and user interface 30 has its own dedicated bus 46 which is preferably a PCI bus. A host bridge 48 provides an interface of both busses 44 and 46 to the CPU 12. The other functions and capabilities provided by the host bridge 14 and FIG. 1 are also included in the host bridge 48 of FIG. 4.

Figure 6:
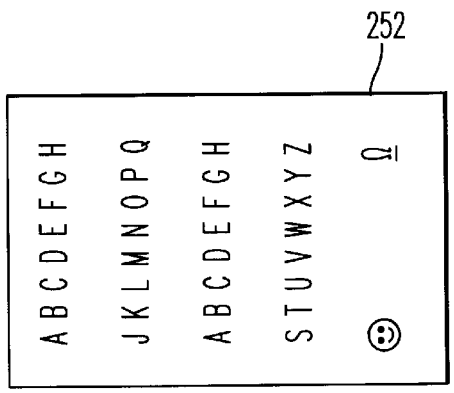
FIG. 6 illustrates an orientation of an image.
Figure 7A:
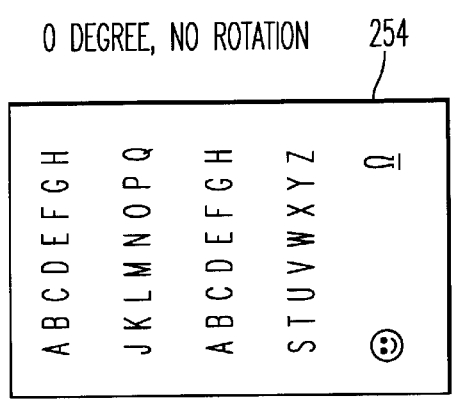
FIGS. 7A–7D illustrates four rotations of the image of FIG. 6.
Figure 7B:
Figure 7C:
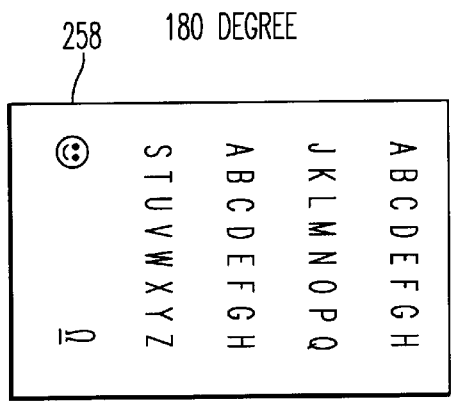
Figure 7D:
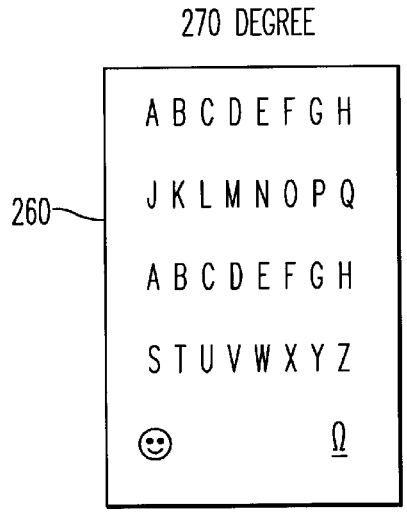

A function performed by the digital copier of the present invention is rotating images. For example, FIG. 6 illustrates the orientation of an original image 252. FIG. 7A illustrates this image with zero degrees of rotation or no rotation, FIG. 7B illustrates this image rotated 90 degrees in a counter-clockwise direction, FIG. 7C illustrates an image 258 rotated 180 degrees, and FIG. 7D illustrates an image 260 rotated 270 degrees in a counter-clockwise direction. The present invention works most efficiently on the four types of rotation shown in FIGS. 7A–7D, although other amounts degrees of rotation may be performed, if desired.

Figure 8:
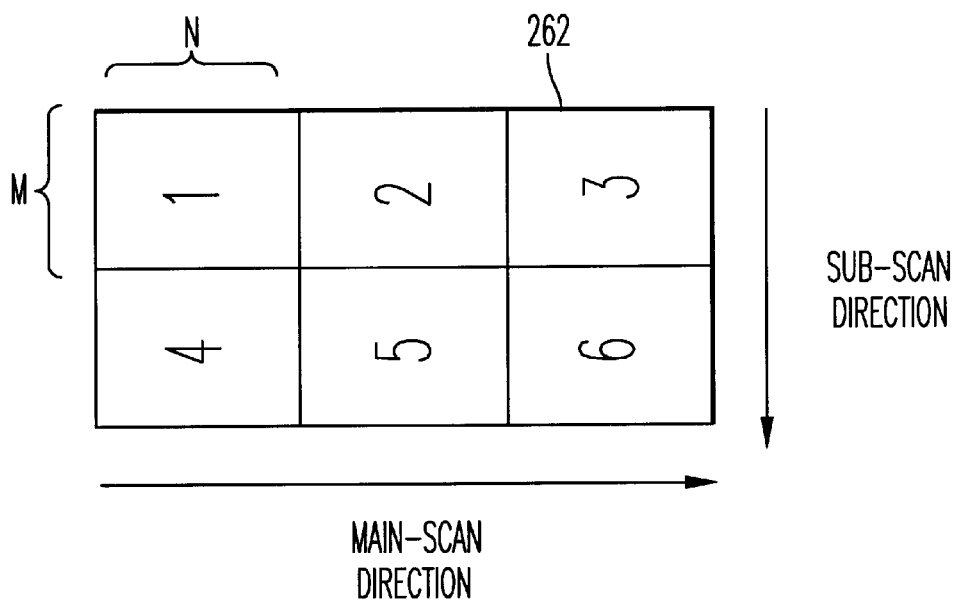
FIG. 8 illustrates an image to be rotated divided into six blocks.

FIG. 8 illustrates an image 262 which is to be rotated as it is being scanned. The image 262 is illustrated as being divided into six smaller blocks. The present invention operates efficiently by working on smaller blocks of an image. The preferred embodiment of the invention operates on blocks of 16 pixels by 16 pixels which occupy 32 bytes. Thus, while the example used for illustration purposes in FIG. 8 shows the image divided into 6 blocks, for an example image which is 8½ inches wide by 11 inches wide, the image will be 319 blocks (8.5 inches×(600 pixels/inch)/(1 block/16 pixels)) wide by 413 blocks in length and therefore be made up of 131,747 blocks. These numbers are merely exemplary and other resolutions and block sizes are possible. When scanning an image, the image is obtained one main-scan line at a time. Each time a main-scan line is obtained, the main-scan line drops down (or alternatively up) one pixel in the sub-scan direction. As an exemplary embodiment of how the invention may be implemented, in FIG. 8, there may be a charge coupled device ("CCD") which extends in the longer direction of the image 262 (horizontal with respect to the orientation of the drawing sheet) across blocks 1, 2 and 3. In FIG. 8, the block 1 is illustrated as having M main-scan lines by N pixels (or N columns of pixels). The blocks of FIG. 8 each have a number therein which is written sideways. These numbers are not only used to identify the block but are used to show the orientation of the image data within the block. The rotation of the image of FIG. 8 is performed by individually rotating the data of each of the blocks, referred to as a microrotation. The rotation of the image data within the block is performed as if the image data is being rotated about a point at the center of the block. After the image data of a block is rotated, this image data is written to an appropriate position in memory. By writing the data to an appropriate position, the location of the block is written into a rotated position in memory. This type of rotation is referred to as a macrorotation. The controlling and rotation of this process may be carried out by the scan interface and processor 96 of FIG. 3. An example of how the rotation process is performed is illustrated in FIGS. 9A–9G.

Figure 9A:
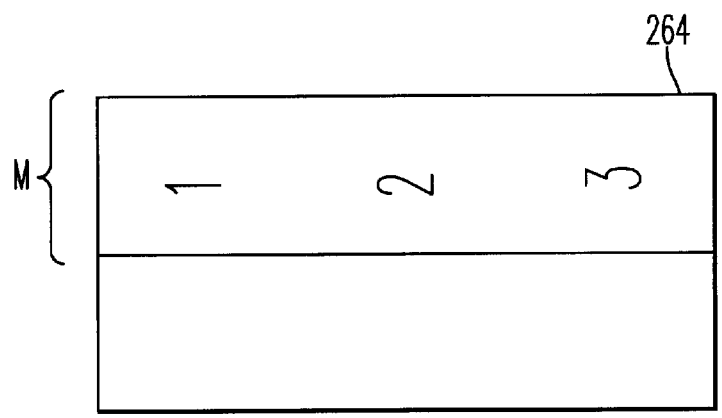
FIGS. 9A–9G illustrates the process of data manipulation in order to rotate the scanned image of FIG. 8 and specifically.
Figure 9B:
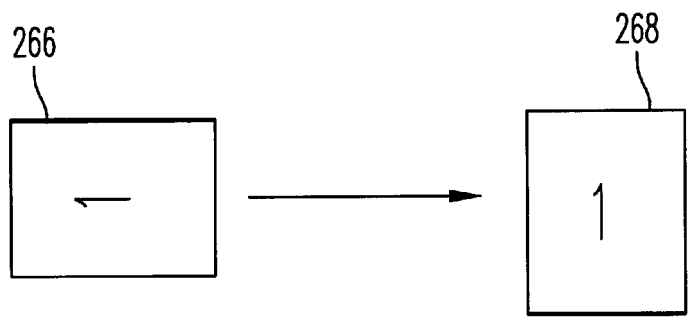

In FIG. 9A, image data 264 is obtained by scanning M main-scan lines of an image. After the M main-scan lines are obtained, data exists for the first row of blocks which are illustrated as blocks 1, 2, and 3. The first block 266 of FIG. 9B is obtained by constructing the block to have the first M main-scan lines by N pixels or N columns of pixels. After the block 266 is obtained, it is rotated in any desired manner to have the orientation of the image 268 of FIG. 9B. This is the microrotation and may be about a point of block. The block may be rotated, for example, as illustrated in U.S. Pat. No. 4,271,476, which is incorporated herein by reference. However, any other desired manner of block rotations may also be utilized.

Figure 9C:
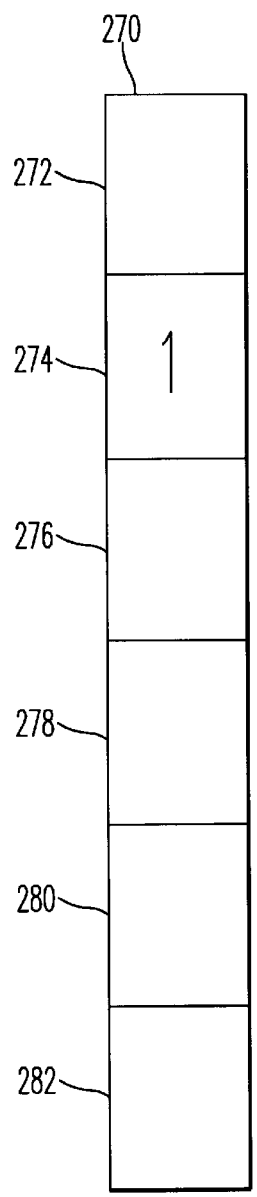

After the first block of the image is rotated and the data of the image block corresponds to the image 268 of FIG. 9B, the image block must be written to the appropriate place in memory. For a rotation of 90 degrees in a counter-clockwise direction, the image data is written to position 274 in a memory 270 reserved for the entire image, as illustrated in FIG. 9C. This accomplishes the macrorotation operation and functions to change the position of the block.

Figure 9D:
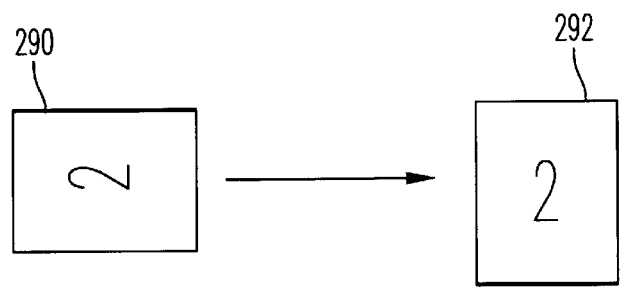
Figure 9E:
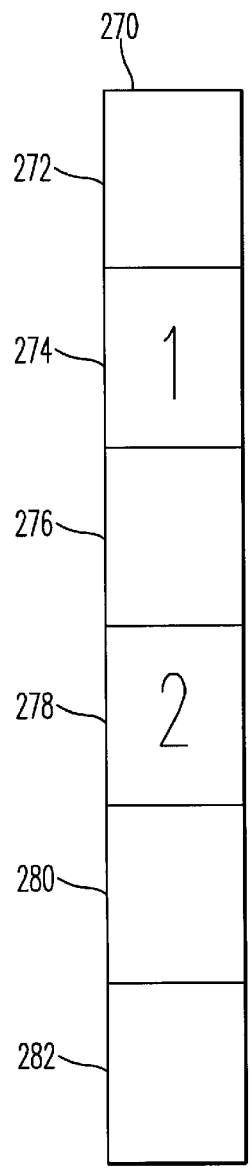
Figure 9F:
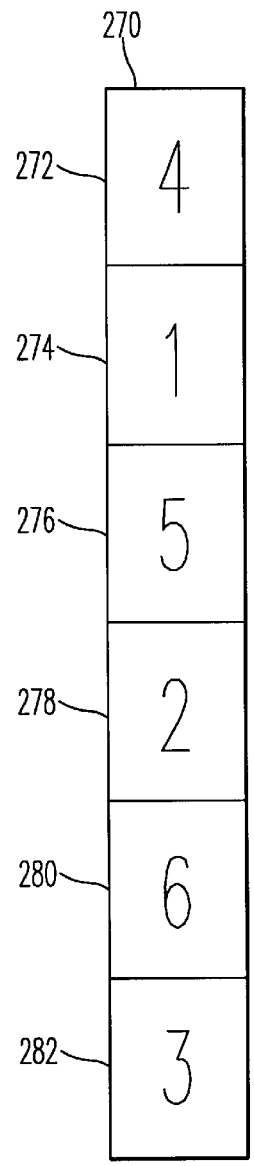
Figure 9G:
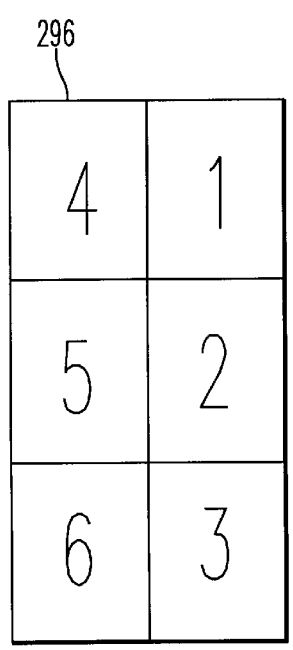

Next, the second block 290 illustrated in FIG. 9D is rotated 90 degrees clockwise and then corresponds to the image 292 of FIG. 9D. This second block is then written to memory position 278 in the memory 270, as illustrated in FIG. 9E. After all blocks are rotated and written into the memory 270, the memory is arranged to contain the image data as illustrated in FIG. 9F. In FIG. 9F, the block with the image data four is stored in position 272, block one is stored in position 274, block five is stored in position 276, block two is stored in position 278, block six is stored in position 280, and block three is stored in position 282. In order to subsequently print the image data as stored in FIG. 9F, the image data is read out of the memory sequentially from position 272 to position 282 to generate the final rotated image 296 of FIG. 9G.

Figure 10A:
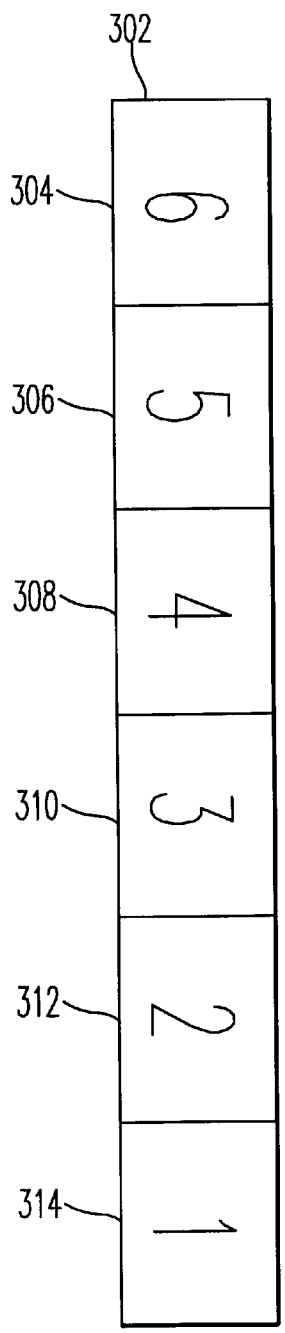
FIG. 10A illustrates how the image of FIG. 8 is stored in memory after being rotated 180 degrees.
Figure 10B:
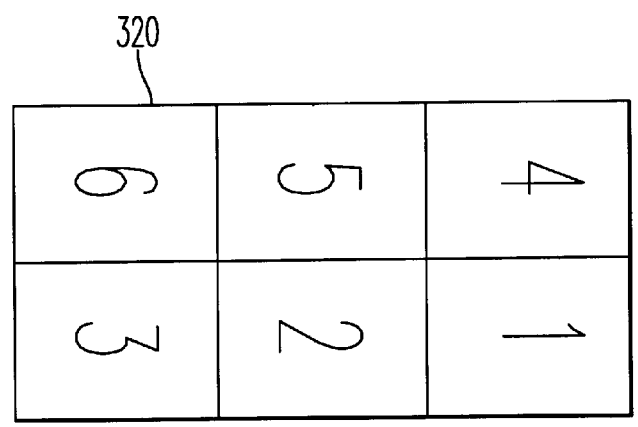
FIG. 10B illustrates the image generated using the data arrangement of FIG. 10A.

If it were desired to rotate the image of FIG. 8 180 degrees, a similar process may be performed by individually rotating the blocks 1–6 of FIG. 8, 180 degrees and storing them in the order as illustrated in FIG. 10A. In FIG. 10A, the memory 302 contains blocks six, five, four, three, two, and one stored in positions 304, 306, 308, 310, 312, and 314 respectively. When the image data of FIG. 10A is read out of memory for writing and to generate an image, an image 320 may be generated which in the first row contains the image data from blocks six, five, and, four and in the second row contains the image data from blocks three, two, and one.

Figure 11:
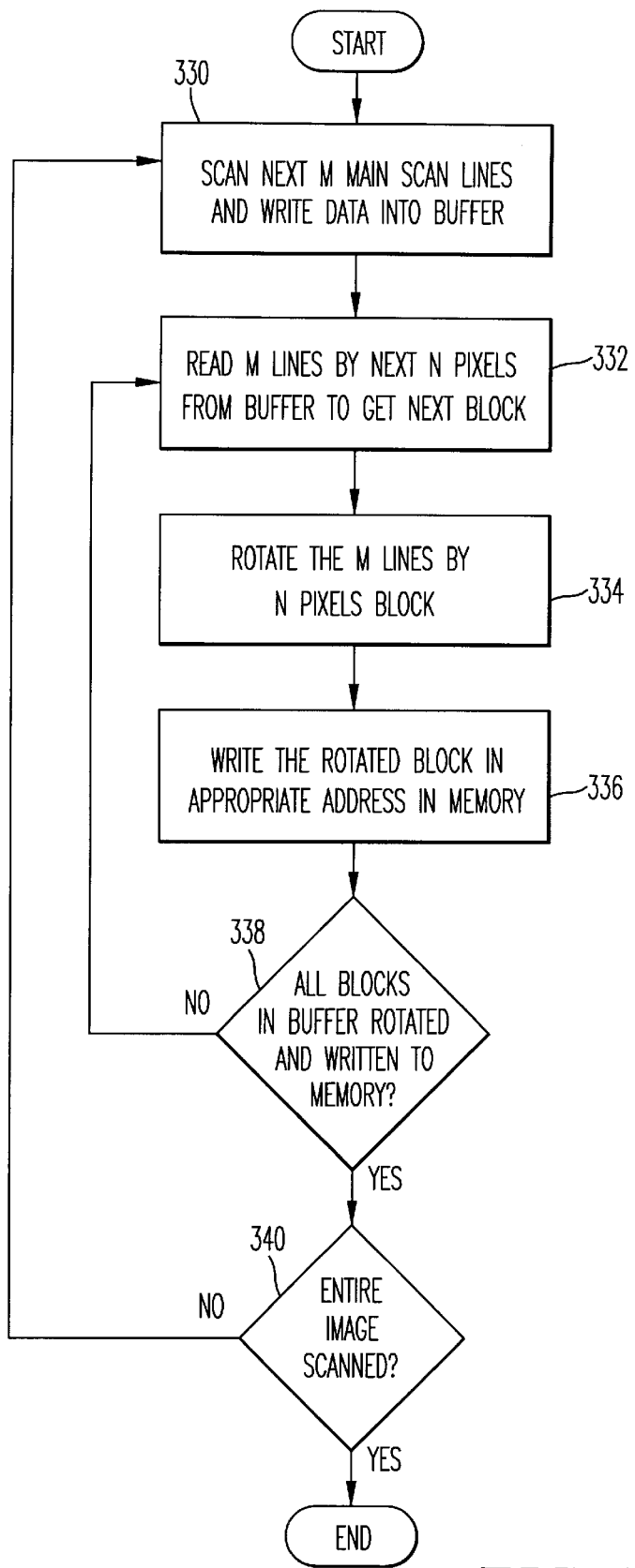
FIG. 11 illustrates the process used to rotate images.

FIG. 11 is a flowchart illustrating the process for rotating images which operates in accordance with the examples illustrated in FIGS. 9A–9G, and 10A and 10B. After starting, step 330 scans the next M main-scan lines and writes the data from the scan lines into a buffer. This buffer may be the scan data RAM 98 of FIG. 3 which in the preferred embodiment is 32 KBytes, although any other type of memory or size of memory may be utilized. The first time step 330 is performed, the first M main-scan lines are obtained. After the M main-scan lines are obtained, enough image data has been collected so that blocks of the image may be rotated. Step 327 reads M lines by the next N column of pixels from the buffer in order to generate a small block for rotation. The first time step 332 is performed for a row of image data, the block which is obtained has columns made of the first N pixels and subsequent blocks contain subsequent N columns of pixels. Step 334 then rotates the block in any desired manner. Next, step 336 writes the rotated block into the appropriate address in memory. The appropriate address in memory can be readily realized by knowing the orientation of the desired final image. For example, in FIG. 9G, the orientation of the final image is seen and this image is generated using the image data written into the appropriate positions as illustrated in FIG. 9F. Similarly, FIG. 10A illustrates the appropriate positions of the image data in order to generate the image of FIG. 10B. It is to be noted that the images of the examples of FIGS. 8, 9 and 10 are merely examples and should not be considered limiting. Any order of writing the blocks into memory and any manner of rotating the blocks may be utilized.

Next, step 338 determines if all blocks in the buffer (the buffer containing the M main-scan lines) have been rotated and written to the appropriate place in memory. If they have not all been rotated (or rotated and written into memory), flow proceeds back to step 332 which reads the data for the next block for rotation. If step 338 determines that all blocks have been rotated, step 340 determines if the entire image has been rotated and written to memory. If it has not, control proceeds back to step 330 where the next M main-scan lines are scanned and subsequently written into a buffer. If the entire image is determined to have been scanned and rotated in step 340, the process of FIG. 11 ends.

It is to be noted that in the process of FIG. 11 (and the other processes of this invention), due to the nature of a flowchart, it is difficult to illustrate functions occurring in parallel (e.g., simultaneously). However, in actual operation and to have the most efficient operation, several processes may occur simultaneously. For example, the scanning operation preferably does not take place in a start and stop fashion but after the M main-scan lines are obtained, the rotation process of steps 327, 324, and 336 occurs while the next M main-scan lines are being obtained. Further, other processes of FIG. 11 may also be performed in a parallel fashion, if desired.

A feature of this invention relates to the flipping of an image which may be required when the sub-scan direction of the scanning operation is opposite to the sub-scan direction of the printing or facsimile transmitting operation, and/or the main-scan direction of the scanning operation is opposite to the main-scan direction of the printing operation. FIG. 12A illustrates the sub-scan direction proceeding from the top of the drawing Figure towards the bottom of the Figure (or from right to left when viewing the image 350 in its proper or upright orientation). When this information is ultimately printed, if the main-scan and sub-scan directions of the printer correspond to the main-scan and sub-scan directions of the scanner, the printed image 352 illustrated in FIG. 12B will look the same as the scanned image of FIG. 12A. However, if the sub-scan or main-scan direction of the scanner is in an opposite direction as to the subscan or main-scan direction of the printer, there will be a problem unless the image is flipped, as explained below.

A problem of obtaining data from scanning which results in the need to flip often results from the type of automatic document feeder ("ADF") which is used, although it may also result from the direction of the main-scan direction of the CCD or other image sensor used in the scan unit 24. A common ADF reverses a face-up page in the ADF tray to be face-down on a glass or other transparent platen of the scan unit 24. Such an ADF place the sheet to be scanned in a same orientation as a person manually making a copy. Thus, the sub-scan direction is the same when using the ADF as when copying sheets manually placed on the platen without using the ADF. This type of arrangement scans the image as illustrated in FIG. 12A and often produces an image such as in FIG. 12B and thus, there may not be a need to flip the image.

However, other types of document feeders may be utilized such as a "sheet through type" feeder which results in a need to flip the image. This type of feeder is commonly found in facsimile machines and some multi-function machines and digital copiers. This type of feeder, when used in a facsimile machine, permits a reduced amount of memory in the fax machine (or multifunction machine) as the data may be compressed and sent as the page is being scanned, making it unnecessary in some cases, to store the entire page of data being sent by facsimile, although the data may be stored before transmittal, if desired. When this type of document feeder is used, the scanner assembly is usually fixed in position but the document moves. Typically, this will cause the sub-scan direction to be opposite as compared to a standard copy operation, but the main-scan direction will stay the same or be in a normal direction. The main-scan direction of the scanner is usually fixed and depends on how the CCD is positioned (e.g., from left to right or from right to left, or alternative from top to bottom or from bottom to top), during assembly of the scan unit 24. During a standard copy operation using this type of ADF, the first part of the image is usually the last part to be scanned (see e.g., the letter "A"s in FIG. 12A). However, when using the ADF, the first part of the document is the first to be scanned (see e.g., the "A"s in FIG. 13A).

FIG. 13A illustrates the sub-scan direction of an image 354 being from the bottom of the image to the top of the image, when viewed in the normal orientation of the drawing sheet, which is an opposite direction to the sub-scan direction of FIG. 12A. The image obtained from the scan of FIG. 13A is illustrated in FIG. 13B. This image is reversed or a mirror image of the scanned image. In order to correct this image for proper printing, the image is flipped about an axis, preferably in a middle portion of the image, although it can be located anywhere, which is parallel to a sub-scan direction. The resulting image, when flipped about an axis parallel to the sub-scan direction is illustrated in FIG. 13C. While the image of FIG. 13C appears as if it is rotated 180 degrees about a point in the image of FIG. 13A, the flipped image may have any desired orientation, depending on how the image is flipped and the arrangement of the scanner and the ADF.

As with the image rotation explained above, flipping process is done on a block basis and may be performed at the same time as the image rotation. Further, the flipping process may be considered a type of rotation but instead of flipping the images within the blocks about a point, the image data is flipped or rotated about an axis which is parallel to the sub-scan direction. In addition to flipping the image data within the blocks, the position of the blocks are also flipped or rotated about an axis parallel to an axis which extends in the sub-scan direction.

Assume now that FIG. 14A illustrates 9 pixels of a block of image data which has been obtained from a scanning operation, such as the block 1 illustrated in FIG. 9B. In order to print this small block, there is a requirement to flip the pixels of the block of FIG. 14A to the position of 14B. However, not only must the pixels of the blocks be flipped, the position of the blocks must also be flipped.

Assume now that FIG. 14A no longer represent the pixels but represent the blocks (blocks of pixels) of the image, the position of blocks 3 and 1 illustrated in FIG. 14A need to be flipped to obtain the block positions illustrated in FIG. 14B (in addition to flipping the pixels within each of the blocks). Thus, blocks 3 and 2 in FIG. 14A would be flipped to get the resulting blocks as illustrated in FIG. 14B and these blocks would be stored in memory before printing. Similarly, the positions of blocks 6 and 4 would be flipped, as would the positions of blocks 9 and 7.

The process for flipping the blocks may be carried out utilizing the process illustrated in FIG. 11. However, the process of FIG. 11 would be modified by changing step 334 to recite rotate and flip the M lines by N pixels block (in order to perform rotation about a point and the flipping about the sub-scan axis). When performing step 336 of writing the rotated block into the appropriate address in memory, this step would also take into account the required flipping of the positions of the block. However, the flipping may be accomplished with or without the rotation about a point operation.

Figure 15:
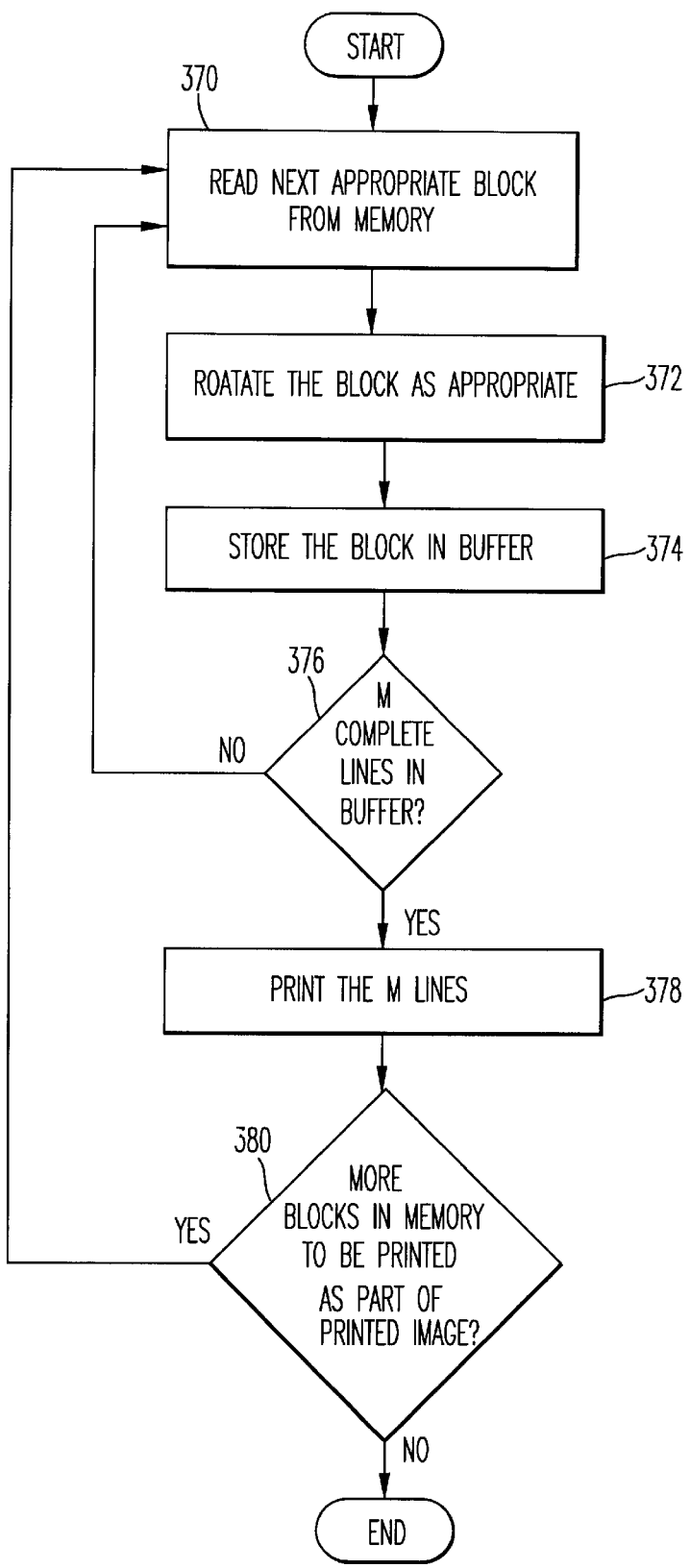
FIG. 15 illustrates a process of rotating an image immediately before printing.

Another feature of this invention is the rotation of images between the time they are read out of the memory 16 or 20 and the time they are printed by the plot unit 26. The process of FIG. 15 which shows the rotation of images before plotting is similar in operation to the flow chart of FIG. 11 which rotates the image between the time the image is scanned and when it is written to the memory. The rotating and controlling of rotating of this process is carried out by the plot interface and processor 92 of FIG. 3. Thus, the rotating and flipping operations performed on the scan data may be simultaneously performed with the rotating (and flipping if desired) performed on the data about to be plotted or printed. After starting in FIG. 15, step 370 reads the next appropriate block from memory. For example, if the image 296 of FIG. 9G were stored in memory as illustrated in FIG. 9F and it was desired to print an image from this data as illustrated in the image 262 of FIG. 8, the first block to be read from FIG. 9F would be block 274 containing the image data for the first block, the block is written to the DMA read buffer 80, and this image data is rotated from the orientation of the image 268 of FIG. 9B to the image 266 of FIG. 9B. The image data of the block 266 would then be written into a buffer such as the buffer 94 of FIG. 3 so that the first M scan lines include therein the first N columns of pixels with the data of the image 266 of FIG. 9B. Next, the image data for block two stored in memory section 278 of the memory 270 would be read out and rotated from the orientation 292 of FIG. 9D to the orientation 290 and subsequently written into the buffer in the next N columns of the M scan lines. Finally, the data of block three of memory location 282 will be read from the memory 270 FIG. 9F, rotated, and written to the memory buffer to form M main-scan lines as illustrated in FIG. 9A. These M scan lines would then be printed.

Referring back to FIG. 15, after rotating the block in step 372 and storing the block in the temporary storage buffer in step 374, step 376 would determine if there are M complete lines in the buffer, such as RAM 94 (as illustrated in FIG. 9A). If there were not, the next appropriate block would be read out in step 370. If step 376 determined that the M complete lines were read, control would proceed to step 380 which would determine if there are more blocks in the memory to be printed as part of the image. If there were, the next appropriate block would be read, rotated and stored in the buffer as explained above. In the example of the data as stored in FIG. 9F, the next block which would be read out of memory and rotated would be blocks 272,276, and 280, respectively. When step 380 determines that there are no more blocks in memory to be printed as part of the printed image, the process of FIG. 15 ends.

Other functions which may be performed by this invention which operate on a block basis relate to the performing of logical operations using two or more images. FIGS. 16A, 16B and 16C are set forth in order to illustrate the concept of ORing two images. The ORing function simply combines or lays on top of each other the image data from two separate images. Thus, when ORing the image 390 of FIG. 16A with the image 392 of FIG. 16B, the resulting image 394 is as illustrated in FIG. 16C.

When ANDing two images, the resulting image only contains a black pixel where the corresponding pixels in the two original images are both black. For example, the image 396 of FIG. 17A, when ANDed with the image 398 of FIG. 17B results in the image 400 of FIG. 17C. The entirely black upper region of the image 398 of FIG. 17B results in any pixel which is black in the upper half of the image 396 of FIG. 17A being included in the resulting image 400 of FIG. 17C while the lower half of FIG. 396 of FIG. 17A is effectively masked out because all pixels on the lower half of the image 398 of FIG. 17B are white. Thus, the ANDing operation may also be referred to as a masking operation. A true ANDing function as illustrated in FIGS. 17A, 17B, and 17C may be counter-intuitive in certain situations where there is a desire to mask out a portion of an image. For example, people ordinarily think of the color black as covering up an image whereas the example of FIGS. 17A, 17B, and 17C show the opposite effect where the color black actually causes the letters to be printed. Thus, it may be desirable to make the ANDing function produce a result which is opposite to the result of FIG. 17C and utilize black pixels of one image to mask the pixels of another image when the combination image is generated. For example, the black pixel section of FIG. 17E is used to mask the lower region of FIG. 17D in order to generate the image of FIG. 17F.

Figure 18:
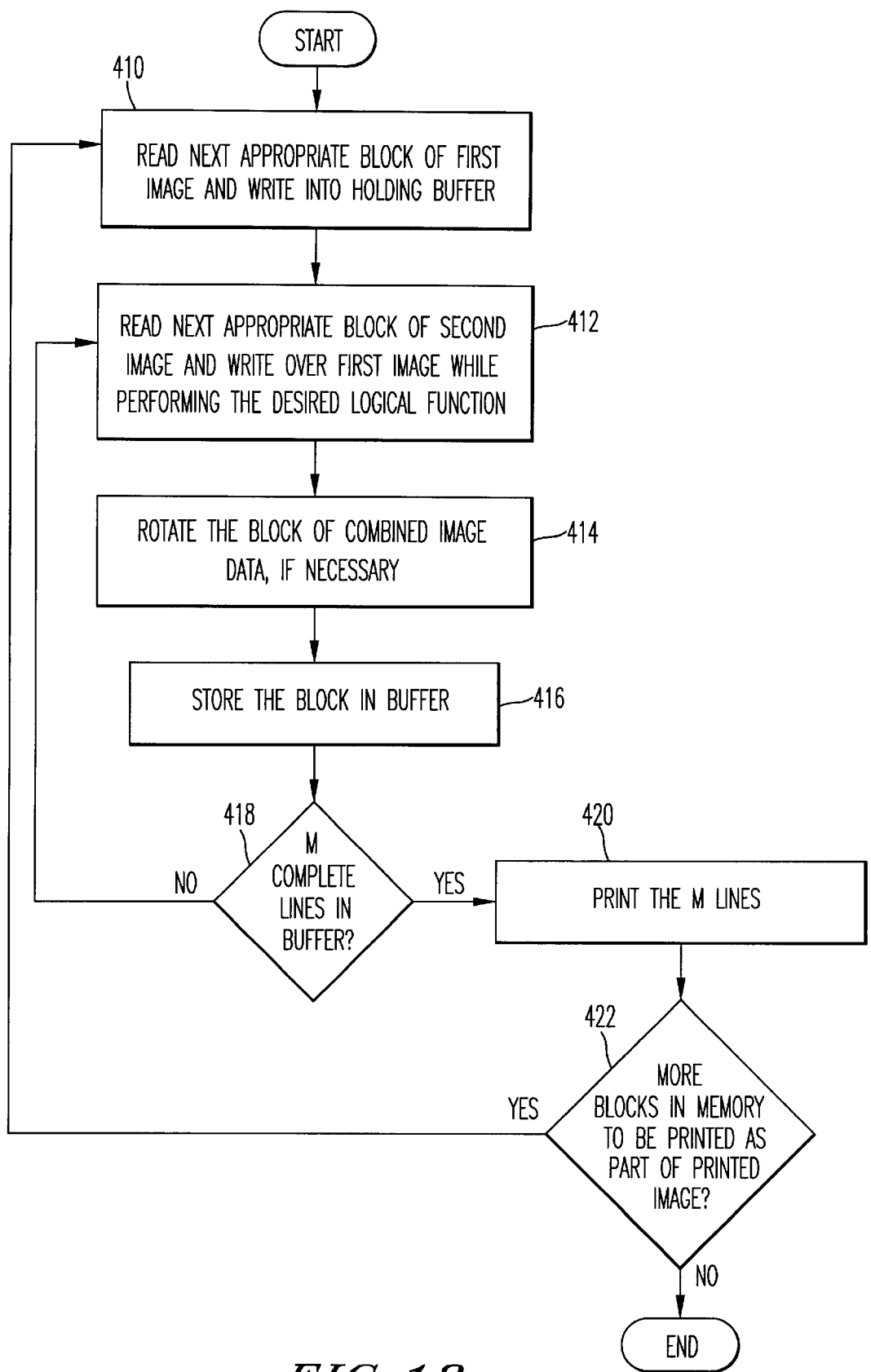
FIG. 18 is a flowchart showing the process of performing a logical operation on images using blocks of the images.

FIG. 18 is a flowchart illustrating the process of combining the images. After starting, step 410 reads the next appropriate block of a first image and writes this block into the holding buffer, for example the DMA read buffer 80 of FIG. 3. Step 412 then reads the next appropriate block of the second image and writes over the first image in the buffer while performing the desired logical function. Thus, the DMA read buffer may be implemented to perform the logical operations and may do so based on the control and status registers 84 and/or instructions from the plot interface and processor 92. The block from the first image and the block from the second image correspond in position to each other. The holding buffer is preferably constructed so that the desired logic function is performed upon the writing of the second image. For example, when performing an OR function, black pixels of the second image are written to the appropriate position in the holding buffer while white pixels do not change the status of the black pixels of the first image which already exist from the first image in the holding buffer. Similarly, when performing the ANDing or masking function, the buffer is constructed to automatically perform the function of ANDing or masking the block of the first image with the corresponding block of the second image.

Step 414 then rotates the block of combined image data, if necessary and step 416 stores the block in a buffer which is to be printed. If step 418 determines that M complete main scan lines are stored in buffer, step 420 then prints the M main-scan lines. If step 418 determines that there are not M complete lines in the buffer, the logical operation must be performed on additional blocks and control proceeds back to step 410. After the M lines are printed in step 420, step 422 is performed which determines if more blocks in the memory are to be printed as part of the printed image. If there are more blocks to be printed, flow proceeds back to step 410 to read the next block of the first image and to repeat the process for the additional blocks. If step 422 determines that there are no more blocks to be printed, the process of FIG. 18 ends. While the process of FIG. 18 is illustrated with respect to printing, as an alternative to printing the logically combined images, the images may be stored for later use or display without being immediately printed.

Another process performed by the present invention is referred to as image repetition or plot image repetition. In this section, a user selects a region of an image (or an entire image) and this region (or image) is repeatedly generated in order to form a new image. As an example, in FIG. 19A there is illustrated an image 430. A user selects the section with the words "Pick Now" as indicated by the dashed line of the image 432 of FIG. 19B. Then, the process of the invention repeats the selected section of the image and forms an image using this repeated section such as the image 434 illustrated in FIG. 19C. A benefit of this invention is that it may be useful to generate repeated copies of half page, third page, or quarter of a page (and also other fractions) images, for example. As a specific example, FIG. 20A contains an image 436 which only occupies half of a page. In FIG. 20B, the dashed line illustrates an image 438 which has this half page image selected. The result of the image repetition process is an image 440 illustrated in FIG. 20C which has the half page image printed at the top half of the image and also at the bottom half of the image. This results in a savings of paper as the final printed image may be cut in half, resulting in a 50% savings in paper usage.

In order to provide a more detailed example of the operation of this embodiment, the image is broken into smaller blocks such as the block 442 illustrated in FIG. 21. In this embodiment, for purposes of convenience, the main-scan direction is illustrated to be in the horizontal direction and the sub-scan direction is illustrated to be in the vertical direction of the paper, although these directions may be reversed, if desired. Further, FIG. 21 contains N main-scan lines by M columns of pixels.

Figure 22A:
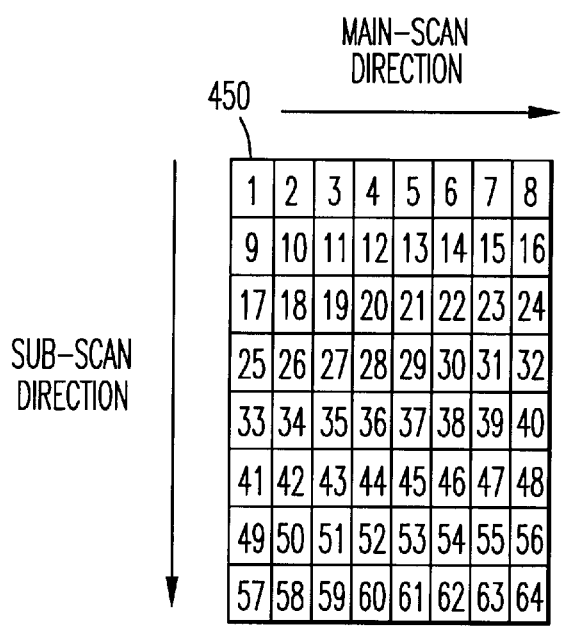
FIG. 22A illustrates all blocks of an image used for an image repeating function.
Figure 22B:
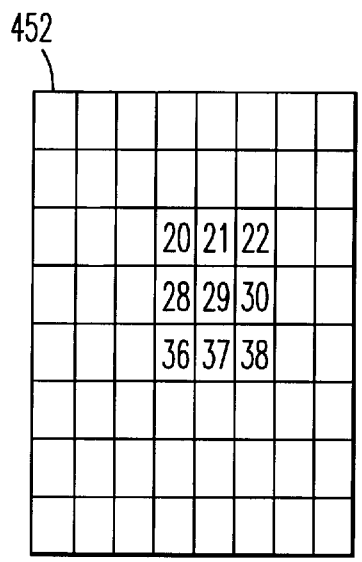
FIG. 22B illustrates a selected section of the image of FIG. 22A used for the repeating function.

For the image repetition function, the image, as with the other embodiments of this invention, is broken into smaller blocks. FIG. 22A illustrates an image 450 broken into 64 smaller blocks, although any number of blocks may be utilized, as desired. In the preferred embodiment of the invention, the blocks contain 16 pixels per column and 16 main-scan lines. In FIG. 22B, image 452 illustrates that the blocks 20, 21, 22, 28, 29, 30, 36, 37, and 38 have been selected. In the preferred embodiment of the invention, the selection is of a whole number of blocks (e.g. no block can be divided into a smaller portion). This does not present a problem and does not limit the selection of the user when the digital copier has a resolution of 600 dpi (dots per inch) and each block is of a 16 pixel by 16 pixel size as these parameters yield an effective selection resolution of 0.03 inches (16 pixels/600 pixels per inch). An additional reason why this whole block limitation does not present a problem is typically, the resolution of a display will typically be less than 0.03 inches, and the display may impose more of a restriction on the selection process than the selection of whole blocks. However, if desired, the user may select the image without utilizing the boundary of the selected image falling on a whole number of blocks.

Figure 23A:
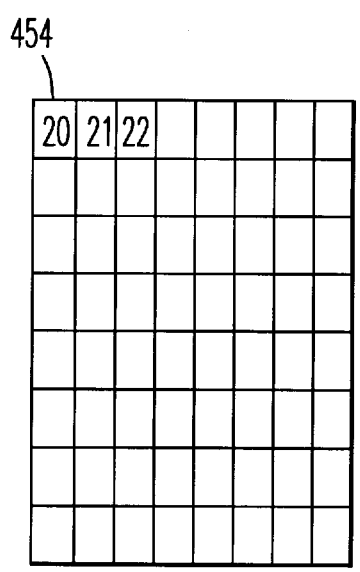
Figure 23B:
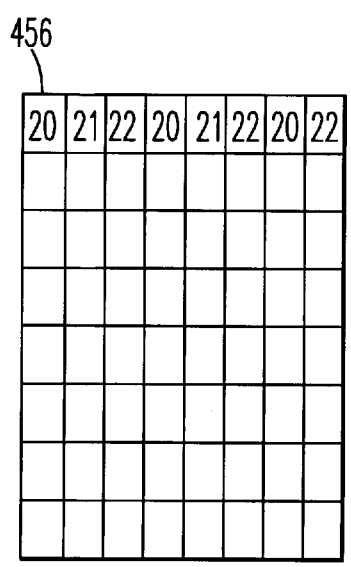

After the desired region is selected by the user in FIG. 22B (or alternatively is automatically selected by the machine such as for convenient locations or sizes which are to be repeated such as the half page, quarter page, and third page size, etc., the new image which is generated using the image repetition process begins to be formed. In FIG. 23A, the first row of selected blocks is written to an image 454. After the last block of the top row of the selected portion of the image is reached, the first block of the first row followed by the second block, etc. are written in the first row of blocks of the constructed image, as illustrated in FIG. 23B.

Next, the second row of blocks of images are repeatedly written to an image 458 as illustrated in FIG. 23C. In FIG. 23D, the process continues and the third row of blocks of the image are repeatedly drawn. Once the third row has been completely written, as the third is the last row of the selected section of the image, the blocks start to be written starting from the first row of the selected image and the final image to be printed is completely constructed, as illustrated in FIG. 23D.

Figure 24A:
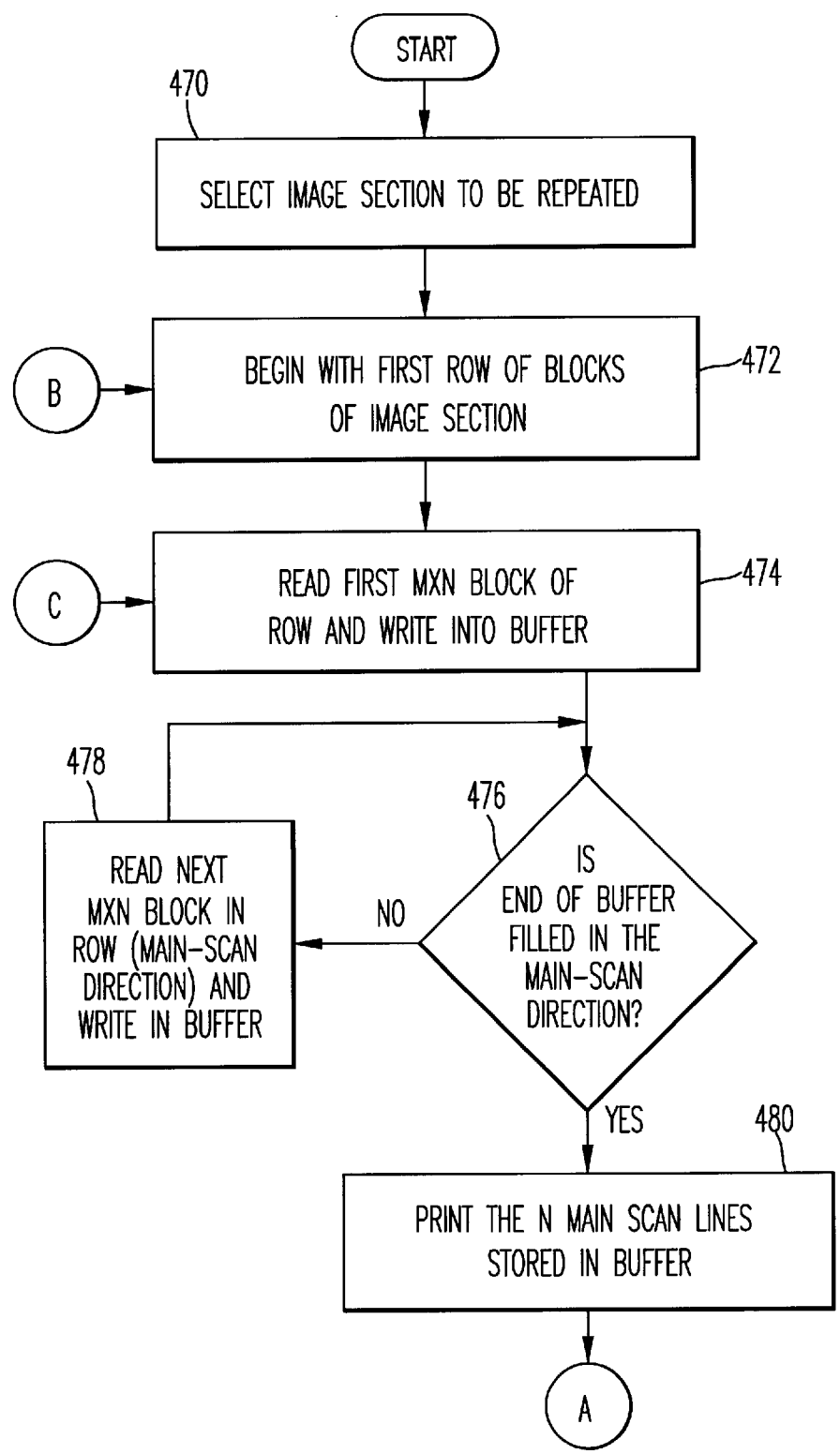
FIGS. 24A and 24B are a flowchart illustrating the process of image repetition.
Figure 24B:
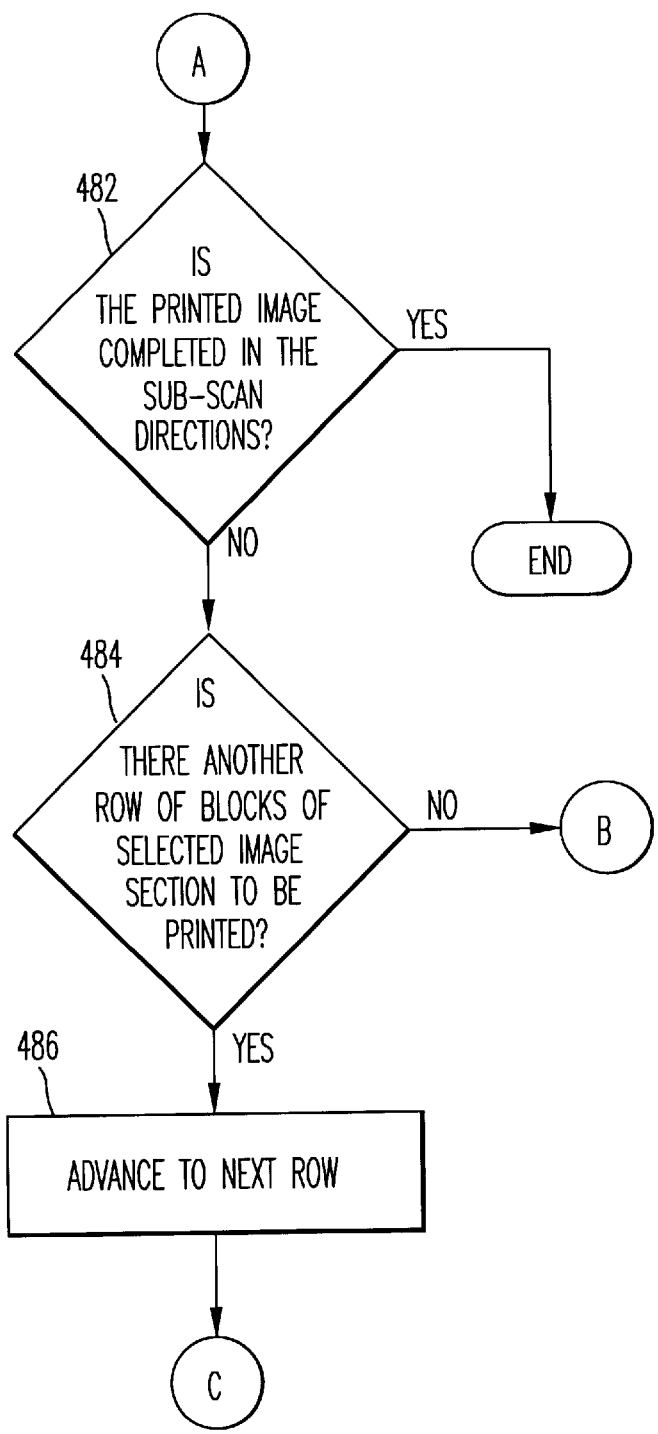

FIGS. 24A and 24B are a flowchart illustrating the image repetition process. After starting, step 470 selects the image section to be repeated. This selection may be preferably performed by a user but alternatively, single or multiple switches or buttons on the user interface 30 may allow the user to select a half page, quarter page, third page or any other predefined repetition section. Preferably, the section to be repeated consists of only whole blocks. However, if desired, the user may be allowed to select other than whole blocks of the image. Next, step 472 begins with the first row of blocks of the image section which is to be repeated and the first M by N block of the row is read from the selected section and written into the buffer. Step 476 determines if the end of the buffer is filled in the main-scan direction. If this is just the first block, then the buffer is not full and flow proceeds to step 478 which reads the next M by N block in the row (e.g. the main-scan direction) and writes this information into a buffer. After the entire row of the buffer is full (see for example FIG. 23B), flow proceeds to step 480 which prints the M main-scan lines which are stored in the buffer. Again, it is noted that for this particular function and example, the main-scan and sub-scan directions are reversed as compared to the other examples, and also the variables M and N have been reversed, although any main-scan and sub-scan directions may be utilized. From step 480, flow proceeds to process A illustrated in 24B.

In FIG. 24B, step 482 determines if the printed image is completed in the sub-scan direction. This step determines if the entire image has been printed. If it has, the process of FIGS. 24A and 24B ends. If the entire image has not been printed, flow proceeds to step 484 which determines if there is another row of blocks of the selected image section to be printed. If there is not another row of the selected image to be printed but the last row of the selected image section was just printed, flow proceeds to process B which is step 472 of FIG. 24A where the first row of the image section begins to be written again into the buffer. Alternatively, if there is another row of blocks the selected image to be printed, step 486 is performed which advances to the next row of the selected image section. The flow then proceeds to process C which is step 474 of FIG. 24A where the first block of this next row is read and the process of FIG. 24A continues.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed:

1. A digital copier comprising:

a processor;

a memory system, connected to the processor;

a scanner;

a plotter;

a user interface;

a bus connected to the plotter, scanner, and user interface; and a processor interface, connected between the processor and the bus, wherein:

the memory system includes random access memory and a disk drive, the disk drive connected to the bus, the processor interface further includes a memory controller and is connected to the random access memory without going through the bus, and the processor interface further includes a controller for the bus, the digital copier further comprising:

an interface connected between the bus and both the scanner and plotter including logic devices, the logic devices receiving and rotating data from the scanner, and receiving print data from the bus and rotating the print data before transmitting to the plotter.

2. A digital copier according to claim 1, wherein:

the processor interface includes a single chip which includes the memory controller and the controller for the bus.

3. A digital copier according to claim 2, wherein:

processor interface includes an interface to a boot memory.

4. A digital copier according to claim 1, wherein:

the interface connected between the bus and both the scanner and plotter is also connected to the user interface.

5. A digital copier according to claim 1, wherein the memory system including:

a plurality of random access memories connected to the processor interface.

6. A digital copier according to claim 5, wherein the memory system includes:

a virtual memory controller which exchanges information between the random access memory and the disk drive.

7. A digital copier according to claim 6, wherein the bus is a PCI bus.

8. A digital copier according to claim 1, wherein the bus is a PCI bus.

9. A digital copier comprising:

processor means;

memory system means, connected to the processor means;

scanner means;

plotter means;
user interface means;
bus means connected to the plotter means, scanner means, and user interface means; and
a processor interface means, connected between the processor means and the bus means,
wherein:
the memory system means includes random access memory an d a disk drive, the disk drive connected to the bus,
the processor interface means further includes a memory controller means and is connected to the random access memory without going through the bus means, and
the processor interface means further includes a controller means for the bus,
the digital copier further comprising:
interface means connected between the bus means and both the scanner means and plotter means includes logic device means, the logic device means receiving and rotating data from the scanner means, and receiving print data from the bus means and rotating the print data before transmitting to the plotter means.

10. A digital copier according to claim 9, wherein:
the processor interface means includes a single chip which includes the memory controller means and the controller means for the bus means.

11. A digital copier according to claim 10, wherein:
the processor interface means includes an interface means to a boot memory means.

12. A digital copier according to claim 9, wherein:
the interface means connected between the bus means and both the scanner means and plotter means is also connected to the user interface means.

13. A digital copier according to claim 9, wherein the memory system means includes:
one or more random access memory means connected to the processor interface means.

14. A digital copier according to claim 13, wherein the memory system means includes:
virtual memory controller means which exchanges information between the random access memory means and the disk drive means.

15. A digital copier according to claim 14, wherein the bus means is a PCI bus means.

16. A digital copier according to claim 9, wherein the bus means is a PCI bus means.

17. A digital copier comprising:
a processor;
a memory system, connected to the processor;
a scanner;
a plotter; and
a processor interface connected by a bus to the processor, and also connected to the scanner and plotter and having circuitry which receives image information from the scanner, processes the image information, and transmits the image information which has been processed, wherein:
the circuitry of the processor interface is configured to perform processing selected from the group consisting of rotating and flipping the image information.

18. A digital copier according to claim 17, wherein:
the circuitry of the processor interface is configured to perform a logical operation selected from the group consisting of ANDING, ORING, and MASKING.

19. A digital copier according to claim 17, wherein:
the processor interface is configured to transmit the information to the memory system after the processing of the information.

20. A digital copier according to claim 19, wherein:
the processor interface is configured to receive the information from the memory system, and to transmit the information to the plotter.

21. A digital copier according to claim 13, wherein:
the processor interface is configured to process the information which has been received from the memory system, before transmitting the information to the plotter.

22. A digital copier according to claim 21, wherein:
the circuitry of the processor interface is configured to perform a logical operation on the information which has been received from the memory system selected from the group consisting of ANDING, ORING, and MASKING.

23. A digital copier comprising:
a processor;
a memory system, connected to the processor;
a scanner;
a plotter; and
a processor interface means, connected by a bus to the processor, and also connected to the scanner and plotter, the processor interface means for receiving image information from the scanner, processes the image information, and transmitting the image information which has been processed, wherein:
the circuitry of the processor interface means is for performing processing selected from the group consisting of rotating and flipping the image information.

24. A digital copier according to claim 23, wherein:
the processor interface means is for performing a logical operation selected from the group consisting of ANDING, ORING, and MASKING.

25. A digital copier according to claim 23, wherein:
the processor interface means is for transmitting the information to the memory system after the processing of the information.

26. A digital copier according to claim 25, wherein:
the processor interface means for receiving the information from the memory system, and for transmitting the information to the plotter.

27. A digital copier according to claim 26, wherein:
the processor interface means is for processing the information which has been received from the memory system, before transmitting the information to the plotter.

28. A digital copier according to claim 27, wherein:
the processor interface means is for performing a logical operation on the information which has been received from the memory system selected from the group consisting of ANDING, ORING, and MASKING.

29. A digital copier comprising:
a processor;
a memory system, connected to the processor;
a scanner;
a plotter; and
a processor interface connected by a bus to the processor, and also connected to the scanner and plotter and having circuitry which receives image information, processes the image information, and transmits the image information which has been processed to the plotter, wherein:

the circuitry of the processor interface is configured to perform processing selected from the group consisting of rotating and flipping the image information.

30. A digital copier according to claim 29, wherein:

the circuitry of the processor interface is configured to perform a logical operation selected from the group consisting of ANDING, ORING, and MASKING.

31. A digital copier according to claim 29, wherein:

the processor interface is configured to receive the information from the memory system before the processing of the information.

32. A digital copier comprising:

a processor;

a memory system, connected to the processor;

a scanner;

a plotter; and a processor interface means connected by a bus to the processor, and also connected to the scanner and plotter, the processor interface means for receiving image information, processing the image information, and transmitting the image information which has been processed to the plotter, wherein:

the processor interface means is for performing processing selected from the group consisting of rotating and flipping the image information.

33. A digital copier according to claim 32, wherein:

the processor interface means is for performing processing which includes a logical operation selected from the group consisting of ANDING, ORING, and MASKING.

34. A digital copier according to claim 32, wherein:

the processor interface is for receiving the information from the memory system before the processing of the information.

35. A digital copier according to claim 1, further comprising:

a single housing for accommodating components of the digital copier.

36. A digital copier according to claim 1, further comprising:

a housing for the scanner; and a housing for the plotter, wherein an interface for the user interface is disposed in one of the housings.

37. A digital copier according to claim 9, further comprising:

a single housing for accommodating components of the digital copier.

38. A digital copier according to claim 9, further comprising:

a housing for the scanner means; and a housing for the plotter means, wherein an interface for the user interface means is disposed in one of the housings.

* * * * *